(12) United States Patent
Mindlin et al.

(10) Patent No.: US 11,902,766 B2
(45) Date of Patent: Feb. 13, 2024

(54) INDEPENDENT CONTROL OF AVATAR LOCATION AND VOICE ORIGINATION LOCATION WITHIN A VIRTUAL COLLABORATION SPACE

(71) Applicant: Verizon Patent and Licensing Inc., Basking Ridge, NJ (US)

(72) Inventors: Samuel Charles Mindlin, Pittsburgh, PA (US); Kunal Jathal, North Hills, CA (US); Shan Anis, Jersey City, NJ (US); David Skuratowicz, Felton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 378 days.

(21) Appl. No.: 17/390,464

(22) Filed: Jul. 30, 2021

(65) Prior Publication Data
US 2023/0032545 A1 Feb. 2, 2023

(51) Int. Cl.
*H04S 7/00* (2006.01)
*G10L 15/22* (2006.01)
*H04L 65/401* (2022.01)

(52) U.S. Cl.
CPC ............. *H04S 7/30* (2013.01); *G10L 15/22* (2013.01); *H04L 65/4015* (2013.01)

(58) Field of Classification Search
CPC .... H04S 7/30; H04S 2400/11; H04S 2400/13; G10L 15/22; H04L 65/4015; H04L 65/403
See application file for complete search history.

(56) References Cited

U.S. PATENT DOCUMENTS

| | | | |
|---|---|---|---|
| 9,411,490 B2* | 8/2016 | Van Wie | G06F 3/0482 |
| 2009/0106670 A1* | 4/2009 | Berndt | H04L 12/1822 |
| | | | 715/757 |
| 2009/0276707 A1* | 11/2009 | Hamilton, II | H04L 51/222 |
| | | | 715/753 |

(Continued)

OTHER PUBLICATIONS

Matsuda, Tomo, et al. "Framework for virtual collaboration emphasized by awareness information and asynchronous interaction." 2008 IEEE International Conference on Multimedia and Expo. IEEE, 2008. (Year: 2008).*

(Continued)

*Primary Examiner* — Brian L Albertalli

(57) ABSTRACT

An illustrative collaboration space provider system provides a virtual collaboration session that allows for audio communication between a user and one or more other users virtually located within a virtual collaboration space. The user is represented by an avatar located at an avatar location within the virtual collaboration space. The collaboration space provider system receives user input from the user, the user input representative of a voice origination location that is within the virtual collaboration space and is distinct from the avatar location. During the virtual collaboration session, the collaboration space provider system simulates propagation within the virtual collaboration space of a voice communication spoken by the user. The propagation of the voice communication is simulated to originate from the voice origination location and not from the avatar location. Corresponding methods and systems are also disclosed.

20 Claims, 10 Drawing Sheets

(56) References Cited

U.S. PATENT DOCUMENTS

| | | | | |
|---|---|---|---|---|
| 2010/0316232 | A1* | 12/2010 | Acero | H04R 27/00 |
| | | | | 379/202.01 |
| 2011/0210962 | A1* | 9/2011 | Horan | G06T 19/003 |
| | | | | 715/757 |
| 2012/0115603 | A1* | 5/2012 | Shuster | A63F 13/55 |
| | | | | 463/31 |
| 2014/0368543 | A1* | 12/2014 | Hamilton, II | A63F 13/54 |
| | | | | 345/633 |
| 2017/0123752 | A1* | 5/2017 | Nadler | G06T 13/205 |
| 2019/0306644 | A1* | 10/2019 | Norris | H04R 5/027 |
| 2021/0266694 | A1* | 8/2021 | Mate | H04S 7/30 |
| 2022/0078374 | A1* | 3/2022 | Au | G06F 3/0486 |
| 2022/0103963 | A1* | 3/2022 | Satongar | G06F 3/0486 |
| 2022/0232128 | A1* | 7/2022 | Glisic | H04M 3/568 |

OTHER PUBLICATIONS

Fernando et al., "Phantom sources for separation of listening and viewing positions of multipresent avatars in narrowcasting collaborative virtual environments." 24th International Conference on Distributed Computing Systems Workshops, 2004. Proceedings . . . IEEEE, 2004. (Year: 2004).*

* cited by examiner

INDEPENDENT CONTROL OF AVATAR LOCATION AND VOICE ORIGINATION LOCATION WITHIN A VIRTUAL COLLABORATION SPACE

BACKGROUND INFORMATION

There is a demand for ever more effective, convenient, and flexible ways of facilitating communication between people who are located remotely from one another. As one example, the increase in the number of people who perform some or all their work from home or other non-office locations rather than from a physical office space or other shared physical space has increased dramatically.

As a result, certain communication challenges have presented themselves. For example, when employees do not share a physical space and are forced to take deliberate steps to initiate communication exchanges (e.g., phone calls, video calls, text chats, etc.), some important impromptu interactions (e.g., hallway conversations, office pop-ins, conversations that are overheard and joined without explicit invitations, etc.) have diminished.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

DETAILED DESCRIPTION OF EXAMPLE EMBODIMENTS

Figure 1:
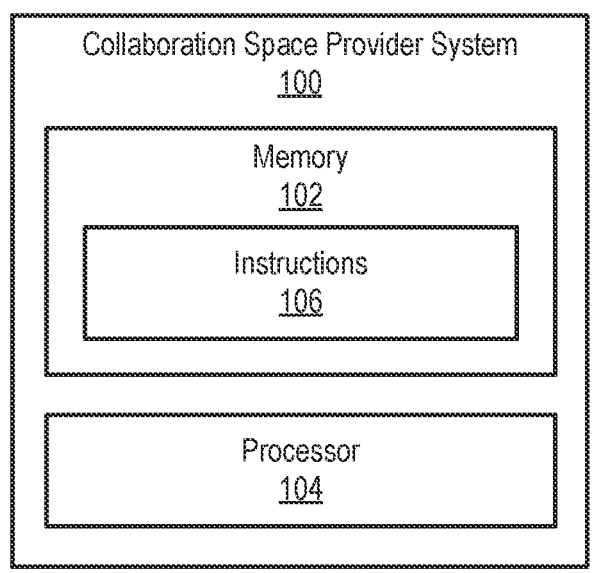
FIG. 1 shows an illustrative collaboration space provider system configured to provide independent control of avatar location and voice origination location within a virtual collaboration space in accordance with principles described herein.

Methods and systems configured to provide independent control of avatar location and voice origination location within a virtual collaboration space are described herein. As mentioned above, certain challenges have presented themselves alongside the various advantages of increased remote communication trends. For instance, coworkers may no longer enjoy the ability to casually converse in the breakroom while having a snack, to chat briefly when passing in the hall, to subconsciously overhear conversations by others within an open workspace (e.g., conversations that, if relevant, a worker may choose to join in on), and so forth. Some organizations (e.g., companies, firms, practices, non-profits, etc.) are discovering that, over time, these challenges can take a toll on social capital within the organization. For instance, these challenges may create meeting fatigue (since preplanned calls and meetings generally must be relied on for any communication to take place), may contribute to a lack of workplace camaraderie and effective teamwork, may reduce informal cross-departmental and/or skip-level interactions, and may thereby generally lead to less collaboration, less innovation, less efficiency, and/or other undesirable outcomes.

As a response to these challenges (as well as other factors), collaboration space provider systems described herein are configured to provide virtual collaboration sessions that allow for audio communication (e.g., voice communication as well as other types of audio sharing including music, prerecorded audio, non-verbal audio, etc.) between users represented by respective avatars located within a virtual collaboration space generated by the collaboration space provider systems. In certain examples, the audio communication provided by these systems may be standard electronic communications such as phone or video calls, virtual voice or video meetings, or other such communications that require specific action to arrange and initiate. In other examples, audio communication provided by collaboration space provider systems described herein may be impromptu voice communications distinct from voice communications traditionally provided by electronic communications systems. For instance, collaboration space provider systems described herein may allow for an "always-on" virtual collaboration experience in which audio communication is transmitted between users based on virtual proximity of avatars, availability status set by users (such that communications may come in most the time but need not be literally "always" on since users may wish to temporarily suspend impromptu communications for various reasons), and so forth.

Virtual collaboration sessions may be enjoyed by users represented by respective avatars (e.g., humanoid avatars or other characters or symbols that represent the users) within a virtual collaboration space provided by the collaboration space provider system. Rather than requiring remote communication to be actively initiated (e.g., sending a message, scheduling and joining a meeting, placing a call, etc.), collaboration space provider systems providing virtual collaboration sessions may allow for impromptu and informal communications between users by attributing avatar locations to respective avatars of each user and then leaving communication channels open (e.g., leaving microphones and speakers on, etc.) throughout the virtual collaboration session in a manner that facilitates real-world interactions. In this way, for example, users (e.g., employees of an organization who are working from home and virtually located within a virtual collaboration space) may communicate in an informal and impromptu manner by simply beginning to talk. As such spoken communication is captured, collaboration space provider systems described herein direct the spoken communication to be presented to other users who are within a virtual vicinity of the user who is speaking (provided that these users are available for receiving such communications), while not distracting users virtually outside of the vicinity of the speaking user.

As will be described in more detail below, these systems and methods may allow users to engage in and/or overhear various informal conversations happening in their virtual vicinity in a natural way that reduces the challenges described above and leads to easier collaboration, increased social capital, and other desirable outcomes. Additionally, such methods of facilitating impromptu communications may be closely integrated with convenient options for converting impromptu communications into more formal or private conversations (e.g., analogous to deciding to step from the hallway into a conference room as a conversation develops or when a whiteboard would be useful, etc.).

Even with such benefits, however, an additional challenge may remain for users engaged in a virtual collaboration experience, particularly for users who are relatively unexperienced with such forms of communication. This challenge relates to a user's ability to precisely understand and control the reach of his or her voice when delivering an impromptu voice communication. With a conventional electronic communication such as a phone call, a person can confidently assume that only the intended recipient who the user has called can hear his or her voice and that people not on the call are not privy to the conversation. Similarly, when speaking in a real-world collaborative space (e.g., an open office space, etc.), the person has an ability to raise and lower his or her voice (e.g., to speak loudly, to whisper, etc.), as well as a natural sense of how far his or her voice carries in the space, thereby allowing the person both control and a relatively accurate understanding of who will be privy to the things the user is saying. A challenge presented by virtual collaboration thus relates to a reduced level of confidence and control users may have regarding who can hear their voice communications within a virtual collaboration space.

As one example of where this may come into play, a user may wish to whisper something to an intended recipient without worrying that the communication will propagate to other recipients besides the one to whom the whisper was directed. For instance, it may be desirable for one person to communicate a thought or comment to another person during a presentation given by a third person without stopping the presentation, sharing the communication more widely, or forcing the communication's recipient to fully divert attention away from the presenter. In a real-world scenario, a whisper may effectively accomplish these communication goals, but electronic forms of communication (e.g., phone calls or even impromptu communications such as those described above) may often be insufficient in achieving these communication goals within a virtual collaboration session.

Accordingly, to address these challenges and help accomplish these types of communication goals, methods and systems described herein allow for a user to independently control an avatar location (e.g., where the avatar that represents the user is located within the virtual collaboration space) and a voice origination location (e.g., the location from whence voice communications spoken by the user originate within the virtual collaboration space) when delivering impromptu communications. For example, as will be described in more detail below, if a first user engaging with others in a virtual collaboration session wishes to whisper something to a second user sitting nearby in the virtual space or even sitting across the room (e.g., in a relatively remote part of the virtual collaboration space), the first user may, without moving his or her own avatar location, designate a voice origination location near an avatar location of the second user such that voice communication spoken by the first user will originate not from the avatar location of the first user, but from the voice origination location near the avatar location of the second user (e.g., right next to the virtual ear of the second avatar, etc.). Moreover, detecting that the first user wishes to whisper or precisely control the reach of the voice communication delivered under these circumstances, a collaboration space provider system described herein may also adjust certain properties of the voice communication to simulate the virtual whisper and/or to otherwise provide the precise voice propagation control and understanding that the user desires.

Virtual whispering implemented by independently-controlled avatar and voice origination locations may mimic real-world whispers in certain respects while also providing certain advantages not possible when whispering in the real world. For instance, a person listening to a presentation in a real-world presentation space (e.g., a conference room) may lower his or her voice to make a comment to a person sitting next to him or her at a volume that can only be heard by the intended recipient. However, this person may not be able to similarly whisper to people located in other parts of the room (i.e., not sitting nearby), and the whispering may be seen and at least partially heard (e.g., in a muffled or non-intelligible way) by others in the vicinity and possibly by a person offering the presentation, who may be distracted and/or annoyed by the whisper.

In contrast, users virtually whispering during a virtual collaboration session described herein may enjoy all the same benefits that attend real-world whispering but without the same limitations. That is, a user listening to a presentation in a virtual collaboration space (e.g., a virtual conference room) may move his or her voice origination location near a virtual ear of any avatar in the space (rather than just being able to lean over to a person sitting nearby) and make a comment that will propagate only as far as the intended recipient and no farther (such that even muffled or unintelligible remnants of the whisper are not heard by others). Moreover, while the virtual whispering may be heard and perhaps visually represented to the intended recipient, it may not be visually represented to others (including the presenter in this example) such that risk of distracting or annoying others is reduced or eliminated. These and various other benefits and advantages of virtual whispering (as well as other communications enabled by independent control of avatar location and voice origination location within a virtual collaboration space) will be described in more detail and/or otherwise made apparent in the description below.

Shared virtual office spaces of organizations like companies or firms provide a convenient illustrative use case for virtual collaboration spaces where virtual collaboration sessions and independently-controllable avatar and voice origination locations described herein may be highly effective and helpful. However, it will be understood that principles described herein may also be applied to various other types of virtual collaboration spaces (other than virtual office spaces) for various other types of use cases as may serve a particular implementation. For example, such spaces and applications may include entertainment spaces (e.g., a virtual theater for screening a movie for a virtual movie festival, a virtual sports box for watching a sporting event with friends, etc.), virtual convention venues (e.g., virtual spaces configured to host large-scale conferences, forums, trade shows, rallies, or other conventions, etc.), spaces configured with games and other interactive events (e.g., used for hosting family or class reunions, virtual birthday parties, etc.), and/or any other shared virtual spaces as may serve a particular implementation.

Additional use cases that may be served by systems and methods described herein may relate to applications such as control room applications (e.g., used during and after an event to oversee everything and make sure it goes as planned), health care applications (e.g., to help patients move through prescribed steps during a visit such as checking in, talking to the doctor, checking out, etc.), help desk applications (e.g., allowing people to virtually walk up to a virtual information technology (IT) help desk or corporate security desk), education applications (e.g., study groups, labs and higher education classes, etc.), team building applications, hybrid applications (e.g., in which users in the office interact with remote users), human resources applications (e.g., to facilitate employee onboarding, recruiting, compensation negotiations, etc.), and/or any other applications as may serve a particular implementation.

Various specific implementations will now be described in detail with reference to the figures. It will be understood that the specific implementations described below are provided as non-limiting examples and may be applied in various situations. Additionally, it will be understood that other examples not explicitly described herein may also be captured by the scope of the claims set forth below. Independent control of avatar location and voice origination location within a virtual collaboration space described herein may provide any of the benefits mentioned above, as well as various additional and/or alternative benefits that will be described and/or made apparent below.

FIG. 1 shows an illustrative collaboration space provider system 100 ("system 100") configured to provide independent control of avatar location and voice origination location within a virtual collaboration space in accordance with principles described herein. System 100 may be implemented by computer resources such as processors, memory facilities, storage facilities, communication interfaces, and so forth. In some examples, system 100 may be implemented by user equipment (UE) devices such as personal computers, mobile devices, communication devices, or other equipment used directly by end users. Additionally or alternatively, certain or all aspects of system 100 may be implemented by computing systems that are not directly used by users. For example, system 100 may be fully or partially implemented by data servers configured to provide communication services, distributed computing systems operated by a communications provider (e.g., multi-access edge computing (MEC) servers), distributed computing systems operated by a cloud-computing provider (e.g., multi-access cloud servers), or other suitable computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with providing a virtual collaboration space in which a virtual collaboration session may take place and in which independent control of avatar location and voice origination location may be provided as described herein and/or as may serve a particular implementation.

Figure 2:
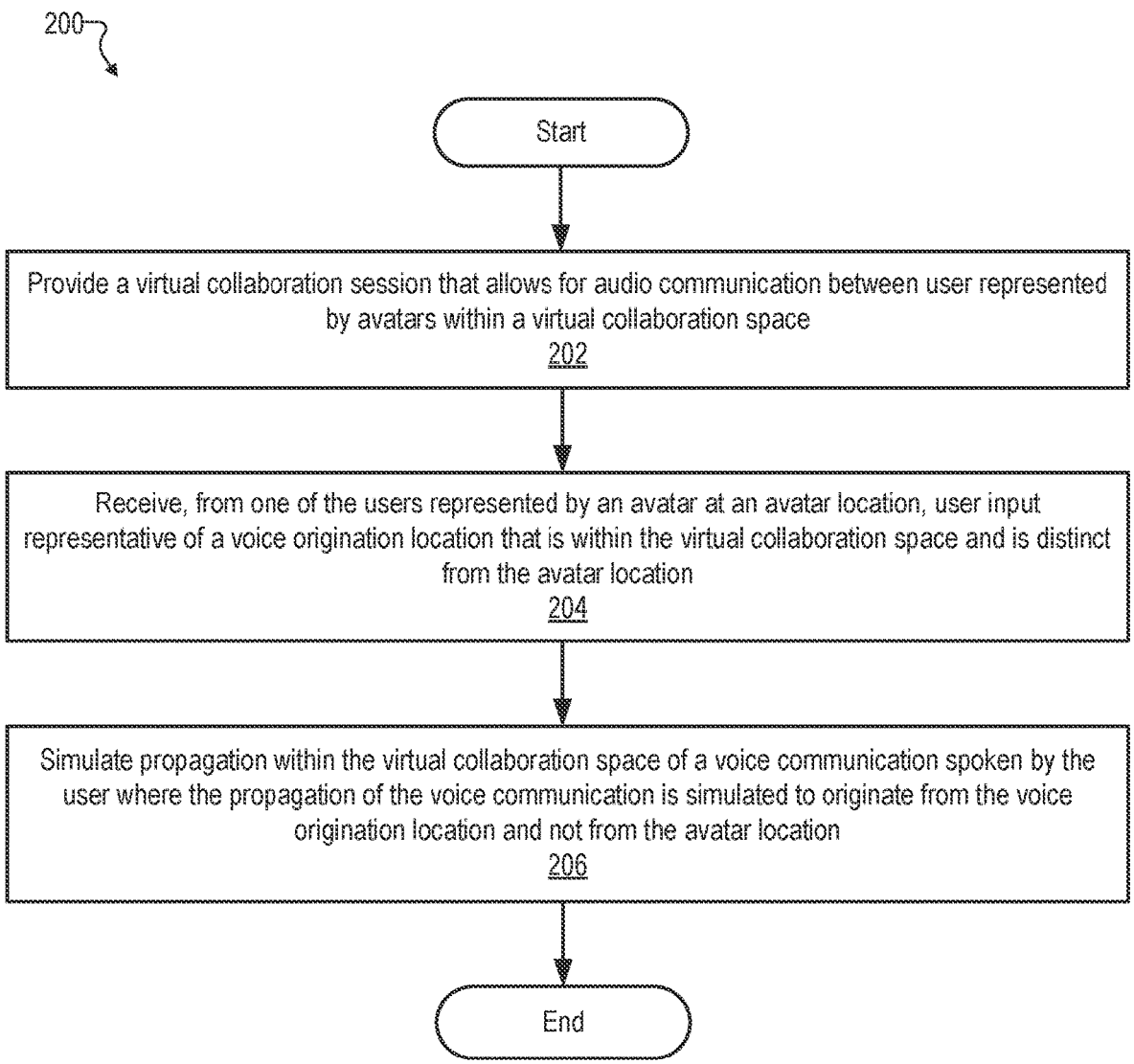
FIG. 2 shows an illustrative method for providing independent control of avatar location and voice origination location within a virtual collaboration space in accordance with principles described herein.

As one example of functionality that processor 104 may perform, FIG. 2 shows an illustrative method 200 for providing independent control of avatar location and voice origination location within a virtual collaboration space in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a collaboration space provider system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by system 100 (e.g., by processor 104 as processor 104 executes instructions 106 stored in memory 102).

At operation 202, system 100 may provide a virtual collaboration session that allows for audio communication between a plurality of users represented by a plurality of avatars located within a virtual collaboration space. More particularly, the virtual collaboration session provided by system 100 may allow a user to communicate with one or more other users virtually located within the virtual collaboration space while the user is represented by an avatar located at an avatar location within the virtual collaboration space, and while the one or more other users are represented by other respective avatars located at other avatar locations within the virtual collaboration space.

As mentioned above, one example of a virtual collaboration space provided by system 100 as part of a virtual collaboration session may be a virtual office workspace in which a team of office workers may virtually work together. In this example, the virtual collaboration session may be associated with an office workday during which users collaborate on one or more tasks within the virtual office workspace. As such, communication channels between users whose avatars are relatively proximate to one another may generally be left open so that, throughout the workday (besides when entering a virtual meeting, indicating that they do not wish to be disturbed, etc.) each user may hear impromptu audio communications happening in the virtual vicinity around him or her, and may project voice communications into the virtual collaboration space to be heard by others according to their proximity and availability status as well. In other examples, the virtual collaboration session provided at operation 202 may involve a virtual collaboration space other than a virtual office workspace, such as any of the other types of virtual spaces described herein.

At operation 204, system 100 may receive user input from the user (i.e., the user mentioned above to be represented by the avatar at the avatar location and who is to communicate with the one or more other users). The user input received at operation 204 may represent a voice origination location that is within the virtual collaboration space and is distinct from the avatar location of the user. Under other circumstances (e.g., prior to the receiving of this user input at operation 204), the default for a voice origination location may be to coincide with (i.e., be identical to) an avatar location of the user's avatar. That is, when the user speaks (e.g., delivers an impromptu communication) during the virtual collaboration session, the communication may, by default, originate from the location of the avatar just as a person's voice in the real-world would originate from the location of their body in the real world. In contrast, under circumstances initiated by the user input received at operation 204, the voice origination location for the user may be any arbitrary location within the virtual collaboration space that the user may select. Rather than or in addition to originating from the location of the user's avatar (i.e., the avatar location), voice communications delivered by the user may be simulated to originate from the location that the user has selected by way of the user input (i.e., the voice origination location). As mentioned, this voice origination location may be distinct (e.g., separate, different, etc.) from the avatar location in this example, such as by being across the room from the avatar location or the like.

At operation 206, system 100 may simulate propagation of a voice communication spoken by the user within the virtual collaboration space. For example, based on the user input received at operation 204 and during (e.g., as part of) the virtual collaboration session provided at operation 202, system 100 may simulate virtual audio propagating throughout the virtual collaboration space, including the voice communication spoken by the user. As mentioned above with respect to receiving the user input for the voice origination location, the propagation of the voice communication at operation 206 may be simulated to originate from the voice origination location instead of or in addition to originating from the avatar location. For instance, the propagation of the voice communication may be simulated to originate from the voice origination location and not from the avatar location.

Additional operations may be added to method 200 to provide various other features and behaviors of virtual audio propagation, voice origination, and virtual collaboration sessions described herein. For example, audio propagation and presentation (e.g., audio rendering) may be performed in a manner that further helps simulate a virtual whisper or another specialized type of impromptu communication (e.g., a virtual public address spoken over a remote virtual megaphone, etc.). Additionally, after a certain event (e.g., additional user input being received, the expiration of an automatic timer, etc.), the voice origination location of the first user may return to the default of coinciding with the avatar location so that the user may again deliver normal impromptu communications based on his or her avatar location, rather than delivering virtual whispers or other specialized impromptu communications based on the separate voice origination location.

Figure 3:
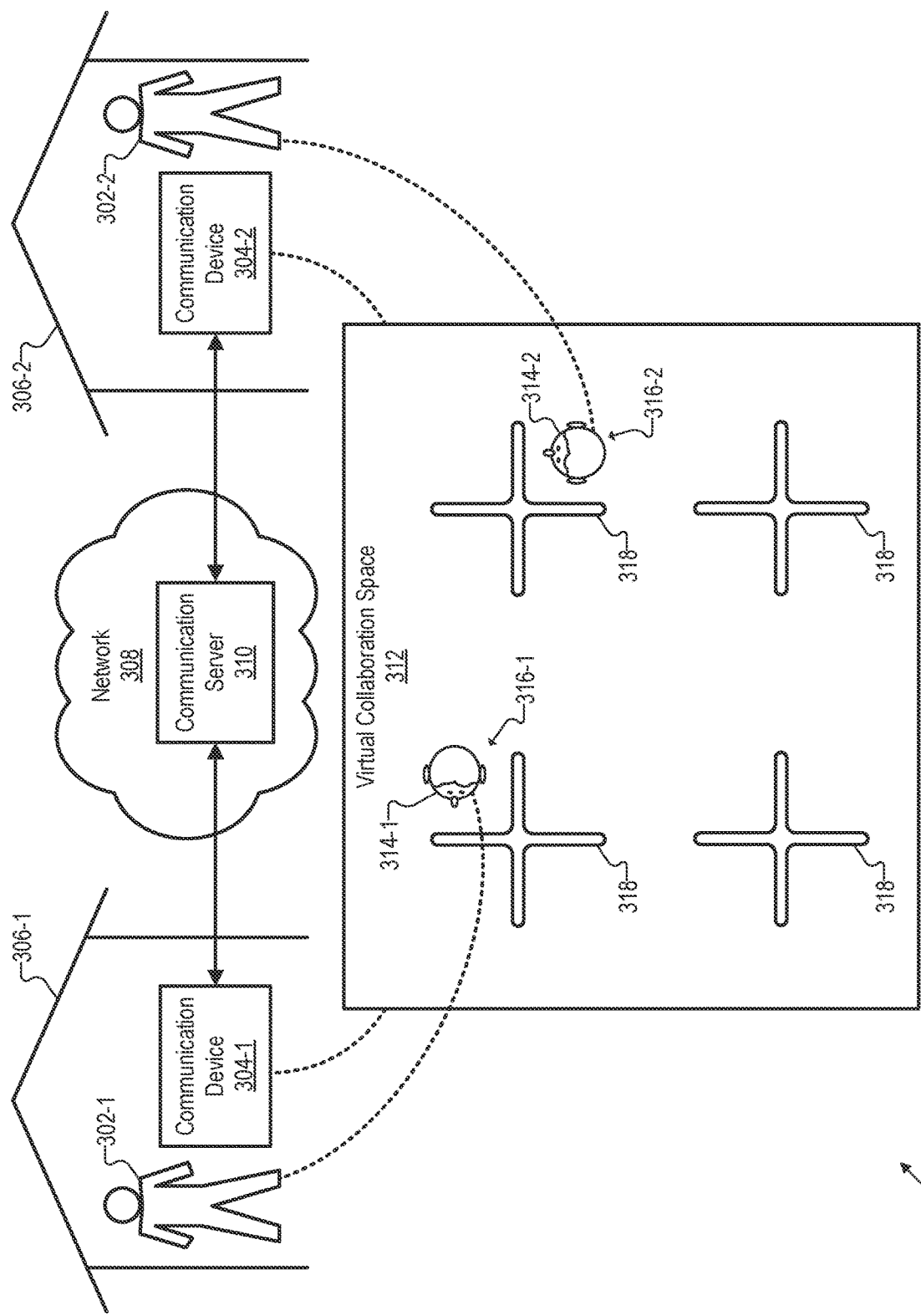
FIG. 3 shows an illustrative configuration in which the collaboration space provider system of FIG. 1 may provide an illustrative virtual collaboration space in accordance with principles described herein.

FIG. 3 shows an illustrative configuration 300 in which system 100 may provide an illustrative virtual collaboration space in accordance with principles described herein. Specifically, as shown, configuration 300 shows first and second users 302 (i.e., users 302-1 and 302-2) that use respective communication devices 304 (i.e., communication devices 304-1 and 304-2) to communicate from different sites 306 (i.e., sites 306-1 and 306-2) over a network 308 that may employ a communication server 310 to facilitate or manage the communication. An implementation of system 100 may be implemented within either or both communication devices 304, within communication server 310 or components of network 308, or by computing resources spread across a combination of these or other suitable systems and devices. In certain examples, each communication device 304 may be associated with (e.g., may implement or be communicatively coupled with) a respective implementation of system 100 that may function in similar ways to provide communication capabilities for the respective users 302 using the communication devices 304.

Also shown in configuration 300 is a virtual collaboration space 312 that may be provided by system 100 to allow users 302 to engage in audio communication during virtual collaboration sessions such as described herein. A visual representation of virtual collaboration space 312 may be presented to each of users 302 by his or her respective communication device 304, as indicated by dotted lines connecting communication devices 304 to virtual collaboration space 312. One or more avatars 314 (e.g., avatars 314-1 and 314-2) may be located within virtual collaboration space 312 at respective avatar locations 316 (e.g., avatar locations 316-1 and 316-2). Avatars 314 will be understood to represent users 302 within virtual collaboration space 312, as indicated by the dotted lines connecting the users and avatars (e.g., connecting user 302-1 to avatar 314-1 and connecting user 302-2 to avatar 314-2). Within a configuration such as configuration 300, system 100 may perform the operations of method 200 and/or any other operations described herein. Certain aspects of components depicted in configuration 300 will now be described in more detail.

Users 302 may represent persons who are using system 100 in any suitable way, such as to collaborate with one another or with other users who are not explicitly shown in configuration 300. For example, users 302 may represent employees of an organization (e.g., a company) who are working from home and need to communicate with one another and/or with other employees (e.g., other employees working from home, employees who are in the office, etc.) as part of their work assignments.

Communication devices 304 may be used by users 302 to engage in a virtual collaboration session (e.g., a virtual workday, etc.) within virtual collaboration space 312 in various ways as may serve a particular implementation. To this end, communication devices 304 may be implemented by any suitable computing devices, media player devices, communication devices, or the like, as may be configured to support a particular type of virtual collaboration experience. For example, a communication device 304 may be implemented by a UE device such as mobile device (e.g., a smartphone, a tablet device, etc.), a personal computer (e.g., a laptop or desktop computer, etc.), or another such device that may be used by a user 302 to perform work-related tasks or otherwise to communicate as may be desirable for a particular communication application or use case.

In certain examples, a communication device 304 may have a capability of presenting a 3D view of virtual collaboration space 312 rather than or in addition to the 2D overhead view illustrated in FIG. 3. For instance, while virtual collaboration space 312 in FIG. 3 shows, from a top view, 2D symbols 318 representing desk clumps or other furnishings and objects within virtual collaboration space 312, a 3D view of virtual collaboration space 312 may show a perspective view of an office space including 3D desks, chairs, partitions, computers, and/or other such objects. Similarly, while the illustrated 2D view of virtual collaboration space 312 shows avatars 314 from the overhead view in this example, a 3D view of virtual collaboration space 312 may show avatars 314 as 3D virtual human characters that walk around the space, sit in chairs while working at a particular desk, and so forth. In some examples, avatars 314 (or their 3D analogs) may be customized in various way as users may desire (e.g., to have a likeness of a respective user, to have characteristics selected by a respective user, etc.).

In addition or as an alternative to presenting a 3D view of virtual collaboration space 312 on a conventional screen (e.g., a computer monitor, a smartphone or tablet screen, etc.), certain communication devices 304 may be configured to provide an immersive virtual collaboration session in which virtual collaboration space 312 and the objects included therein (e.g., avatars 314, furnishings and/or other objects represented by symbols 318, etc.) are presented using an extended reality technology (e.g., virtual reality technology, augmented reality technology, etc.). Accordingly, certain implementations of communication devices 304 may include or be associated with extended reality presentation devices such as head-mounted virtual reality devices or other such devices configured to present extended reality worlds. In some examples, users 302 may switch between 2D and 3D views of virtual collaboration space 312 at will.

In the example of configuration 300, sites 306 may be understood to represent two unrelated sites that are remote from one another. For example, sites 306 may represent the respective homes of users 302, which may be at different addresses nearby one another (e.g., in the same city, etc.) or across the country or the world from one another. As another example, one or both of sites 306 may represent remote workspaces other than home in which users 302 are working at a given time. For instance, sites 306 may represent college campuses, coffee shops, temporary office spaces, or the like. In certain cases, sites 306 may represent different physical offices that are operated (e.g., owned or leased) by a particular organization, such as different offices of the organization located in different cities. Sites 306 may also represent different offices within the same building (e.g., an apartment building, a physical office building) if the sites are remote enough from one another that it is desirable for users 302 to communicate electronically using virtual collaboration space 312 rather than in person.

Network 308 may be implemented by any suitable network or networks that include any elements or technologies as may serve a particular implementation. For instance, network 308 may include elements of a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). Additionally or alternatively, network 308 may include elements of various interconnected networks that are outside of any provider network and outside the control of any provider of such a provider network. Elements of the Internet, a wide area network, a content delivery network, and/or any other suitable network or networks are examples of other elements that may be included within network 308. Any of these provider or non-provider networks or network elements may provide data delivery between different communication devices 304.

Communication server 310 may be communicatively coupled to either or both of communication devices 304 by way of network 308 and may facilitate communications between communication devices 304 in any manner as may serve a particular implementation. For instance, in certain implementations, communication server 310 may represent one or more MEC server devices, cloud server devices, or other distributed computing devices that manage communication data between communication devices 304 in the ways described herein. As mentioned above, in certain examples, system 100 may be fully or partially implemented by communication server 310. In other examples, implementations of system 100 may exist on each of communication devices 304 and communication server 310 may be omitted or perform other operations to facilitate the communication provided by communication device 304. In some implementations, multiple communication servers 310 may be employed in a distributed fashion, such as for purposes of scalability, redundancy, and service quality (e.g., latency reduction), and system 100 may be deployed across such multiple communications servers 310.

Figure 4:
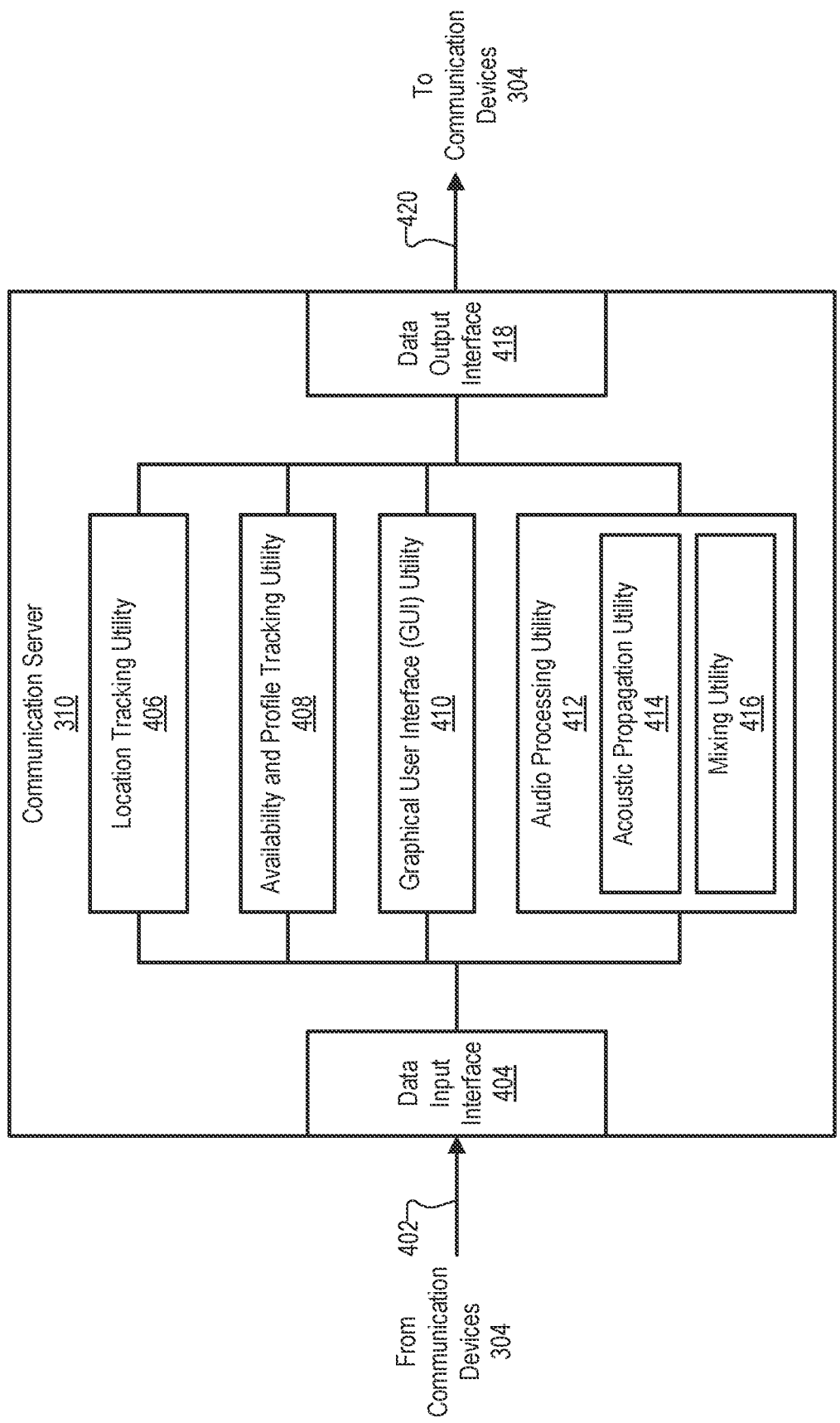
FIG. 4 shows an illustrative implementation of a communication server such as is included in the configuration of FIG. 3 in accordance with principles described herein.

To illustrate one particular way that communication server 310 may be implemented in certain embodiments, FIG. 4 shows an illustrative implementation of communication server 310 that includes various data inputs, data outputs, communication interfaces, and processing utilities to perform operations described herein. Specifically, as shown in FIG. 4, this implementation of communication server 310 receives input data 402 from one or more communication devices 304 using a data input interface 404, which provides relevant input data to a location tracking utility 406, an availability and profile tracking utility 408, a graphical user interface (GUI) utility 410, and an audio processing utility 412 having sub-utilities including an acoustic propagation utility 414 and a mixing utility 416. As shown, each of these and/or any other utilities not explicitly shown may communicate with one another by way of a service bus or another suitable architecture or form of communication. Utilities 406-416 may generate and/or update audio data, user interface data (e.g., video data), etc., for presentation within a graphical user interface displayed by communication devices 304 (e.g., a graphical user interface that includes a 2D and/or 3D representation of virtual collaboration space 312). Audio data and/or user interface data generated by utilities 406 through 416 may be provided to a data output interface 418 that provides this information to communication devices 304 as output data 420. Each of the components shown in FIG. 4 will now be described in more detail.

Input data 402 may include any suitable data received (e.g., transmitted in real time) from one or more communication devices such as communication devices 304-1 and 304-2 shown in configuration 300. Input data 402 may include audio data such as voice or other audio data representative of impromptu communication being provided by one of users 302 or audio data that is part of a pre-initiated communication session such as a call or conference. Input data 402 may also include other types of user input data and/or metadata that may, for instance, indicate when a user 302 logs into the virtual collaboration session (e.g., by logging into a communication portal that provides the virtual collaboration session, etc.), where a user 302 desires to place and/or move his or her avatar location and/or voice origination location, whether a user 302 is available for various types of communication, profile information associated with the user, and so forth.

Data input interface 404 may receive input data 402 by way of a network such as network 308. As such, data input interface 404 may be configured to communicate with communication devices 304 by way of any technologies and/or protocols supported by the network as may serve a particular implementation. In some examples, data input interface 404 may preprocess, sort, and/or steer input data 402 to utilities 406-416 to ensure that each utility receives any input data that is relevant to the function of that utility.

Location tracking utility 406 may receive and process user input data 402 and provide, in real time, information regarding the avatar locations of each avatar 314 included within a virtual collaboration space, as well as, when distinct from the avatar locations, respective voice origination locations associated with each avatar. From the time that a user logs into a virtual collaboration session until he or she logs out, location tracking utility 406 may identify, update, and/or otherwise keep track of his or her avatar location and voice origination location. As location tracking utility 406 generates this location data, location tracking utility 406 may provide the location data to GUI utility 410 to indicate where avatars 314 for each user are to be placed within the representation of the virtual collaboration space. Additionally, the location data may be provided to audio processing utility 412 to facilitate in simulating propagation of, as well as rendering audio for, communications delivered within virtual collaboration space 312. For example, impromptu voice communication may be presented at a sound intensity level that may depend on a relative proximity of one avatar to another or a relative proximity of a voice origination location for one user to an avatar location for another user. Additionally, location data may inform the audio mix since, as described in more detail below, directional audio may be generated based on a relative direction from which audio is virtually originated.

Location tracking utility 406 may be provided with virtual space configuration information, and may use the virtual space configuration information to enforce rules on the locations of avatars within a shared virtual space. For example, location tracking utility 406 may access space layout information (e.g., space sizing, physical barrier locations and characteristics, special spatial characteristics for designated areas such as meeting rooms, break rooms, etc.) from a data store. Location tracking utility 406 may then enforce rules based on the space layout information. For example, location tracking utility 406 may enforce that avatars 314 do not move outside the virtual collaboration space, that avatars do not move through physical barriers that they are not allowed through, that avatars do not occupy the same space at the same time, that only a certain number of avatars occupy a given space, and/or any other such rules as may serve a particular implementation.

Availability and profile tracking utility 408 may receive and process user input data so as to provide, in real time, information regarding various aspects of each user's profile and/or current availability status that are to be graphically reflected in the graphical user interface of the portal. For example, availability and profile tracking utility 408 may maintain images representative of each different user (e.g., profile photos of the users, etc.) that may be provided for display as part of the avatars 314 presented in the virtual collaboration space. As another example, availability and profile tracking utility 408 may manage invitations and/or acceptances of formal communication sessions, manage various settings and/or preferences for each user, and perform various other functions described herein. For instance, availability and profile tracking utility 408 may track whether each user is currently online, maintain data indicating which departments each user is part of and/or where the user fits in a reporting structure of an organization, manage a setting indicating whether a particular user has stereo audio capabilities that would support directional audio capabilities, and so forth.

Availability and profile tracking utility 408 may also receive and process additional user input data that may be sent deliberately by a user or provided automatically by a communication device to indicate a current availability of the user. For example, if a user decides to lower his or her availability (e.g., to disable impromptu communications to focus on a particular task), availability and profile tracking utility 408 may receive data indicating this preference and adjust an availability status for the user. As another example, if a user places or accepts a voice call, availability and profile tracking utility 408 may determine at the commencement of the voice call that the availability status for the user should be changed for the duration of the call and may update the status accordingly. Availability and profile tracking utility 408 may provide the status data to any of the other utilities. For example, by providing the status data to audio processing utility 412, audio processing utility 412 may determine how to mix audio for each user, including where various sounds originate as their propagation is simulated, whether certain or all impromptu voice communications should be muted or included in the mix, and so forth. Additionally, availability and profile tracking utility 408 may provide information to GUI utility 410 to allow proper availability status to be reflected in the user interface (e.g., by way of color or other indicators on each avatar).

GUI utility 410 may receive data from data input interface 404 and/or from various other utilities 406-416 or other sources as have been described above and may provide visual data (e.g., video data, data allowing for a GUI to be constructed and/or updated by communication devices 304, etc.) to each communication device 304 by way of data output interface 418. In this way, GUI utility 410 may facilitate each communication device 304 in presenting various graphical aspects of a virtual communications portal that displays virtual collaboration space 312. For example, based on all the input data received, GUI utility 410 may provide data sufficient to allow a communication device 304 to present a communication portal having a navigation panel (e.g., allowing users 302 to select different virtual collaboration spaces to enter, etc.), one or more virtual collaboration spaces such as virtual collaboration space 312, and/or any other display data as may be included in a particular implementation of the communication portal interface. Moreover, as avatars 314 move and change status, as voice origination locations are defined and given various properties, as different views (e.g., 2D views, 3D views, etc.) are selected, and as other changes occur, GUI utility 410 may continually provide information allowing each communication device 304 to provide a coherent and relevant user interface to its respective user 302.

Audio processing utility 412 may receive and process audio input data (e.g., by way of data input interface 404) and output audio data (e.g., by way of data output interface 418) to be presented to different users 302 by way of their respective communication devices 304. To this end, audio processing utility 412 may include any sub-utilities as may serve to help perform various audio-related tasks described herein. For example, as shown, audio processing utility 412 may include an acoustic propagation utility 414 configured to simulate acoustic sound propagation within a virtual collaboration space, as well as a mixing utility 416 configured to mix or abstain from mixing (i.e., mute) appropriate audio input streams into customized audio output streams that are to be presented to users whose avatars are at different locations within the virtual collaboration space (and thus are hearing different sounds).

Audio processing utility 412 may receive data from location tracking utility 406 (e.g., to determine where a particular user's avatar is located in relation to other users' avatars to properly mix impromptu communications), availability and profile tracking utility 408 (e.g., to determine if a user is logged in, to determine whether a user is engaging in a call or meeting, to determine whether the particular user's avatar is available to receive impromptu voice communication, etc.), and/or other utilities (e.g., including utilities not explicitly shown in FIG. 4) as may serve a particular implementation. Additionally, based on user input received by way of data input interface 404, audio processing utility 412 may receive data indicative of voice origination locations for various users, how long the voice origination locations are to be implemented (e.g., separate from their respective avatar locations), what properties the voice origination locations are to have, and so forth.

Within audio processing utility 412, acoustic propagation utility 414 may simulate acoustic propagation of virtual sound through the virtual collaboration space as the virtual sound originates at one location (e.g., an avatar location of a user who is speaking, a voice origination location of the user distinct from the avatar location, etc.), interacts with various virtual surfaces (e.g., reflecting or reverberating off the virtual surfaces, being absorbed by certain virtual surfaces, etc.), and ultimately arrives at another location (referred to herein as a "termination location") where the sound is perceived (e.g., the virtual ears of another avatar at its respective avatar location, etc.). As certain implementations of audio processing utility 412 combine different sounds together into a single mix (e.g., a binaural audio stream including different audio communications from around the virtual collaboration space) to be presented to a particular user 302, acoustic propagation utility 414 may be configured to apply various filtering techniques, proximity effects, and so forth.

In certain examples, a binaural audio mix may be provided to a particular communication device 304 and acoustic propagation utility 414 may configure the audio data to simulate directional audio that will seem to the user 302 of that device to originate from a particular direction within the virtual collaboration space. In this way, a user may sense which direction audio communications originate from to help the user (along with visual cues provided by the user interface) to discern who is speaking. Additionally, acoustic propagation utility 414 may access data representative of various aspects affecting the acoustics of the shared virtual space (e.g., the location of virtual objects such as walls, cubicle partitions, etc., in the space; the virtual materials from which such virtual objects are constructed and their acoustic properties; etc.). By taking these types of data into account, acoustic propagation utility 414 may simulate the impact of various virtual objects (e.g., walls, furnishings, etc.) on audio propagation, accurately simulate sound propagation within the virtual environment, and so forth.

Within audio processing utility 412, mixing utility 416 may track which input audio streams are to be included in which audio output mixes (e.g., output binaural streams), how dominant each input audio stream should be compared to other streams, which input audio streams should be muted (i.e., not included), and so forth. In certain examples, voice communications may be explicitly indicated or automatically detected to be intended as virtual whispers or other specialized types of impromptu communications. For instance, communications designated as whispers or detected to be spoken in a lowered voice may be treated as virtual whispers, particularly when such communications are delivered by way of a voice origination location distinct from the avatar location. In some examples, mixing utility 416 or another sub-utility of audio processing utility 412 may be configured to artificially learn about when and how people whisper by applying machine learning techniques to the extraction of various acoustic features or in other suitable ways. Accordingly, the utility may develop thresholds to automatically detect when users are attempting to whisper so that the utility can help ensure that the communication is only propagated and mixed as intended.

Once detected in any of these or other suitable ways, mixing utility 416 may be configured to treat virtual whispers (or other analogous types of specialized impromptu communication) differently than standard impromptu communications. For example, as will be described in more detail below, mixing utility 416 may abstain from applying automatic gain to a whispered communication (despite its low volume otherwise calling for such gain to be applied), may further lower the volume or mute the communication from all but the output stream associated with the closest avatar to the voice origination location, may apply processing to make the communication have certain acoustic properties of a whisper, or may perform other suitable types of processing. As will be described and illustrated in further detail below, audio propagation utility 414 may similarly treat virtual whispers in different ways, such as by limiting reflections of virtual whispers propagating through the virtual collaboration space, by reducing the propagation radius of the virtual whispers, and so forth.

All of the utilities 406-416 described above may be implemented by dedicated or shared hardware and/or software resources of communication server 310 to implement functionality described herein. For instance, in certain examples, a single processor (or group of processors) associated with communication server 310 may execute software instructions to implement one or more of utilities 406-416. In other examples, each utility may be implemented by a separate server or server component (e.g., each being associated with a dedicated processor or the like) as may serve a particular embodiment.

Data output interface 418 may receive audio data, visual data, metadata, and/or any other suitable types of data from utilities 406-416, and may communicate this data as output data 420 (e.g., one or more binaural audio streams customized for particular users) to communication devices 304 by way of a network such as network 308. As such, like data input interface 404, data output interface 418 may be configured to communicate with communication devices 304 by way of any technologies and/or protocols supported by the network as may serve a particular implementation. In some examples, data output interface 418 may process, package, sort, address, and/or steer output data 420 to particular communication devices 304 to ensure that each communication device receives data relevant to the function of that communication device.

The components and functionality described above in relation to FIG. 4 may be implemented in one or more communication servers 310 in a distributed manner to facilitate scalability, redundancy, and service quality (e.g., latency reduction). As such, an individual communications server 310 may include one or more components described above, and may communicate amongst other communication servers 310 when necessary to access needed capabilities. Additionally, in some implementations, certain components or functions described above to be performed by communication server 310 may be implemented within or performed by systems or resources other than communication server resources. As one example, communication server 310 may run as a headless server without a graphical interface, and some or all of the functionality described above in relation to GUI utility 410 may be performed by communication devices 304 rather than communication server 310. In like manner, other functionality described in relation to utilities 406-416 may similarly be performed by individual client devices (e.g., communication devices 304), rather than performed at the server level, as may serve a particular implementation.

Returning to FIG. 3, virtual collaboration space 312 may be presented to both users 302 by way of their respective communication devices 304 as a shared world in which the users can see each others' avatars 314 in 2D or 3D or according to any customized view as may serve a particular implementation. As used herein, a virtual collaboration space may refer to any extended reality space in which users are able to communicate with one another, particularly by way of impromptu voice communications (e.g., by way of "always-on" channels allowing the users to hear what is going on around them in the virtual environment, to speak and be heard by those in the virtual vicinity without taking any specific steps to initiate a communication session, etc.). A virtual portal including virtual collaboration space 312 may be implemented by hardware and software of system 100, which, as described above, may be implemented and provided by communication server 310, communication devices 304, or a combination of these and/or other computing devices. Virtual collaboration space 312 may be presented when a user 302 logs into his or her device or signs into communication server 310 at the beginning of a workday, when user 302 authenticates himself or herself to join a convention or other event that makes use of virtual collaboration space 312, or otherwise comes online to begin communicating and collaborating with other users by way of system 100.

In some examples, the virtual portal presenting virtual collaboration space 312 may further include a navigation panel (not explicitly shown) having certain categories (e.g., "Departments," "Online Users," etc.) that may facilitate each user 302 in exploring and discovering communication possibilities, filtering potential people to communicate with in various ways, and so forth. For example, a section of a navigation panel for departments may allow a user to select a shared virtual space associated with a particular department (e.g., Product Design, Engineering, Product Management, Marketing, Sales, Executive Management, etc.) within the organization to see only users who are logged in to work in that department. As another example, a navigation panel may include an Online Users category that lists names of users who are online and may potentially be communicated with (e.g., based on designated availability statuses set by the user).

Virtual collaboration space 312 in this example may represent a particular space (e.g., the engineering department of a company, etc.), and, as such, avatars 314 for each user 302 who is signed in and associated with the particular space (e.g., the engineering department) may be represented within virtual collaboration space 312. Certain virtual collaboration spaces may be configured as public spaces that allow any user (e.g., any user of a particular communication service, any employee of a certain organization, etc.) to enter and collaborate within the space. In contrast, other virtual collaboration spaces may be restricted in various ways as may serve different particular implementations. As one example, a particular company may dedicate a virtual collaboration space to executive officers of the company and this area may be restricted such that other employees of the company are not allowed (e.g., without special permissions) to access the executive virtual collaboration space. These executive officers may have an ability to access virtual collaboration spaces associated with departments they oversee (or all departments), while other employees may only be able to access virtual collaboration spaces that are public or that relate to the department for which they work.

Each avatar 314 may be depicted as a circular token, profile icon, depiction of a person or character, or other suitable drawing or symbol representative of the respective user. Specifically, as shown in this example, an overhead view of a drawing of a person may serve as an avatar 314 for a 2D view of virtual collaboration space 312, while, as mentioned above, 3D depictions of avatars 314 or other types of symbols may serve as avatars 314 in other implementations or for other views.

Any suitable information about a user 302 that a particular avatar 314 represents may be indicated by the visual information presented by the avatar 314 within virtual collaboration space 312. For example, one piece of information that is readily apparent by looking at avatars 314 is the respective avatar locations 316 of the avatars within virtual collaboration space 312. Other information that may be visually indicated by avatars 314 may include the availability status of their respective users (indicated by color, symbolic design, flashing symbols, etc.), whether the users are actively speaking, and so forth.

As has been described, certain virtual collaboration sessions and virtual collaboration spaces provided by system 100 may support voice origination locations that are distinct from corresponding avatar locations (i.e., such that the voice origination locations and avatar locations are independently controlled by the user). As has been mentioned, these examples may allow users more control over, and visibility into, how far-reaching individual audio communications will be. For example, these examples may be used to implement virtual whispers and/or other types of specialized impromptu communication that benefit from having audio communication originate from a location other than the avatar location.

Figure 5B:
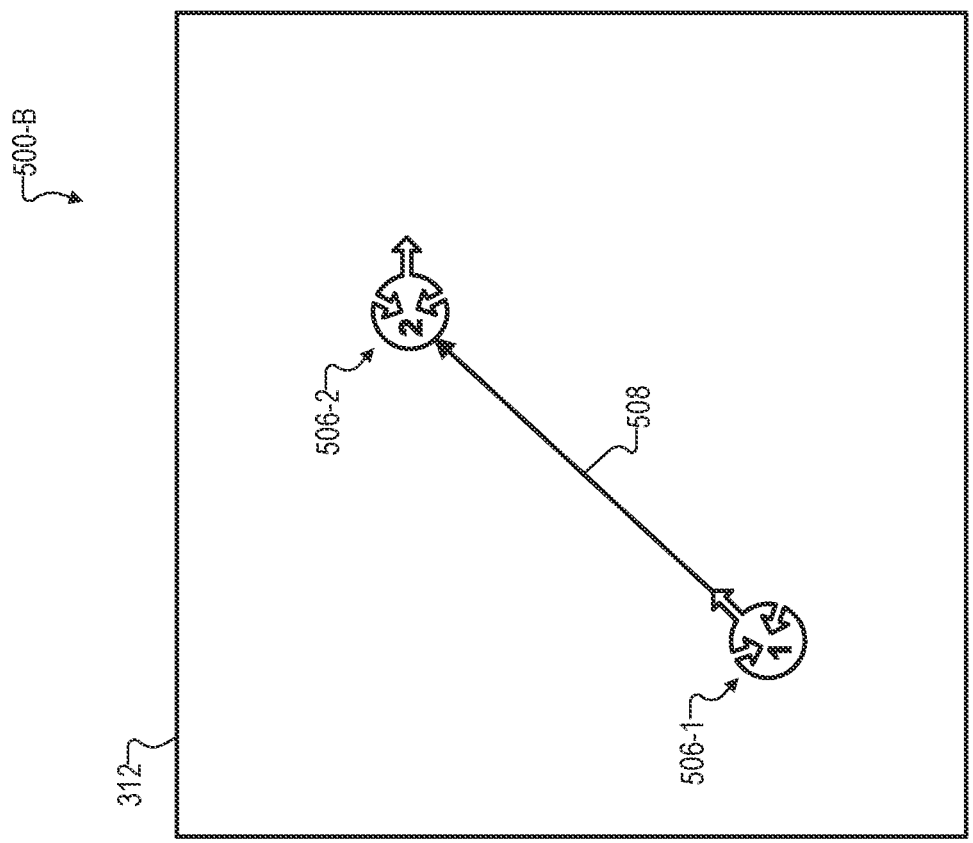
FIG. 5B shows an acoustic propagation view of the illustrative virtual collaboration space of FIG. 5A in accordance with principles described herein.
Figure 5A:
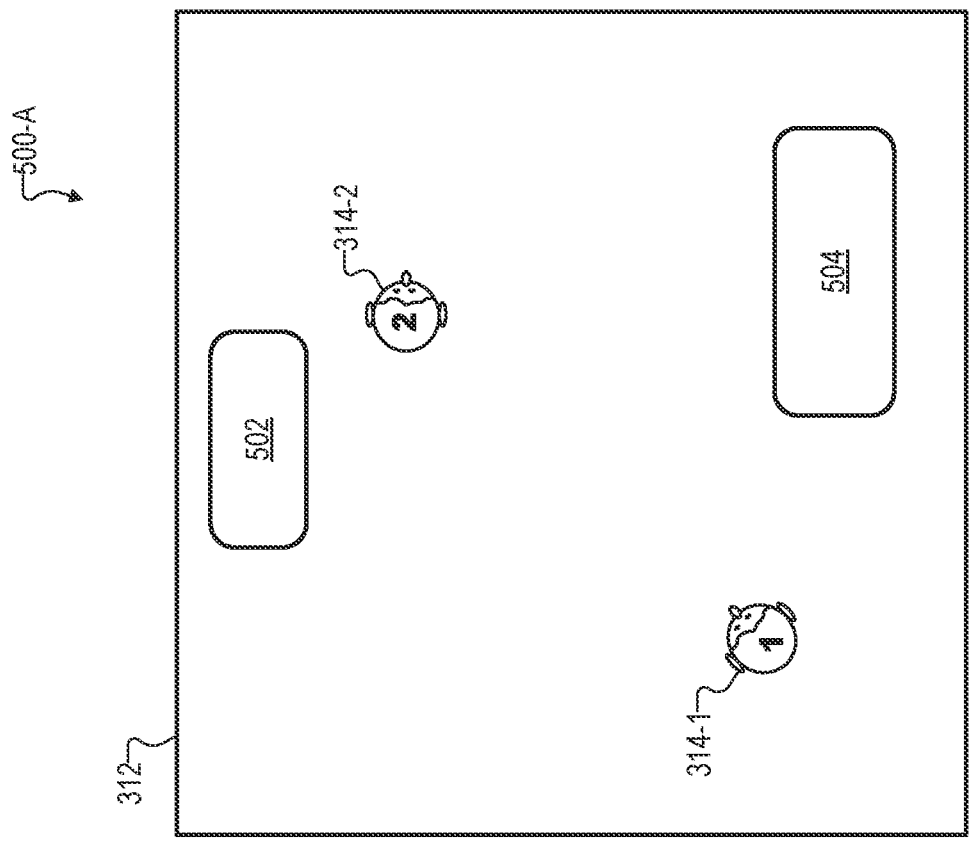
FIG. 5A shows a graphical user interface view of an illustrative virtual collaboration space in accordance with principles described herein.
Figure 6:
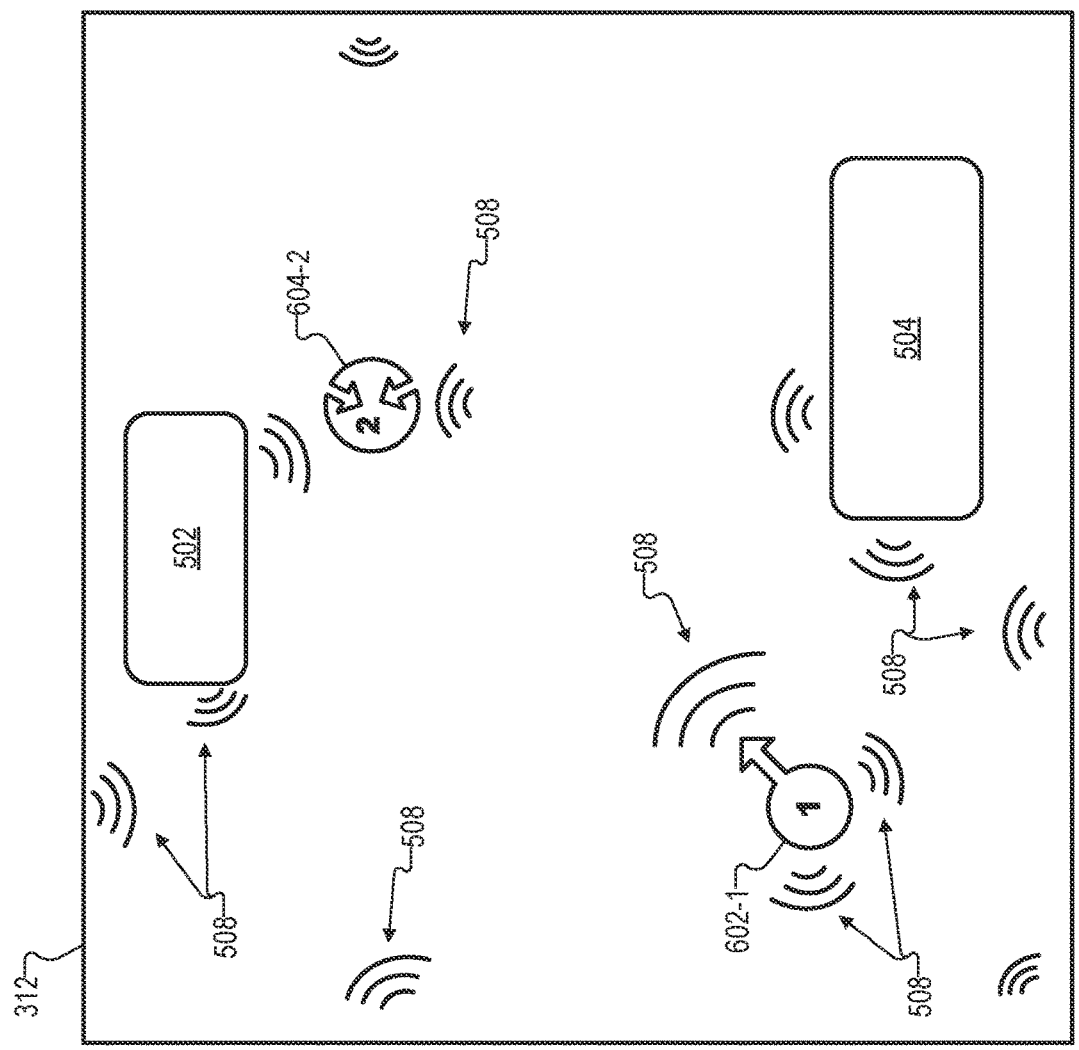
FIG. 6 shows illustrative details of how sound is simulated to propagate through the virtual collaboration space of FIG. 5A in accordance with principles described herein.

Voice origination locations that are independently controlled from avatar locations may have various different attributes and aspects that will now be described in more detail with reference to FIGS. 5A-9B. Specifically, FIG. 5A shows a graphical user interface view of one implementation of virtual collaboration space 312, while FIG. 5B shows an acoustic propagation view of that virtual collaboration space and FIG. 6 shows details of how the sound propagation is simulated within that virtual collaboration space in a particular example. FIGS. 7A-7B, FIGS. 8A-8B, and FIGS. 9A-9B then show examples of different virtual collaboration sessions during which audio communications between users are simulated to propagate with different properties and/or under different circumstances including, for instance, propagating from different voice origination locations (FIGS. 7A-7B), propagating with different propagation radius parameters (FIGS. 8A-8B), and propagating from multiple voice origination locations (FIGS. 9A-9B). It will be understood that the properties, attributes, characteristics, circumstances, and examples described in relation to FIGS. 5A-9B are intended only to illustrate some of the possibilities of how independent voice origination locations may be implemented and used in illustrative implementations, and that combinations of these examples, as well as other examples not explicitly mentioned herein, may also fall within the scope and spirit of the following disclosure.

FIG. 5A shows a graphical user interface view 500-A of virtual collaboration space 312 in which the same two avatars 314 described above (i.e., avatars 314-1 and 314-2) are currently present. As shown, avatars 314-1 and 314-2 are drawn from an overhead viewpoint for the 2D interface view 500-A illustrated. Each avatar 314 is shown to have eyes and a nose facing in a particular direction to indicate the virtual orientation of the avatar within virtual collaboration space 312. Additionally, each avatar 314 is shown to have a number printed on the avatar that matches the reference designator (i.e., a "1" is printed on avatar 314-1, while a "2" is printed on avatar 314-2). This notation will be utilized in later figures as well to indicate which avatars and other icons (e.g., icons described below to represent the locations from which each user's voice communications originate and from which each user audibly perceives sound). It will be understood that "Avatar 1" may be used as a shorthand to refer to avatar 314-1, "User 1" may be used as a shorthand to refer to user 302-1 (i.e., the user represented by avatar 314-1), and so forth for various other users referenced with numbers 2, 3, and so forth.

In FIG. 5A, Avatar 1 is shown to be facing Avatar 2 as Avatar 2 is facing the wall on the right-hand side of virtual collaboration space 312. As will be described in various examples below, it may be the case that User 1 wishes to communicate with User 2 using an impromptu mode of communication. As such, User 1 may direct Avatar 1 to face Avatar 2 and may possibly direct a separate voice origination location to be placed near Avatar 2 (e.g., if the voice communication is to be implemented as a virtual whisper or the like). Additionally, FIG. 5A shows that certain objects 502 and 504 may also be present in this implementation of virtual collaboration space 312. These objects may represent any suitable objects including other avatars, the types of furnishings or fixtures described above with respect to symbols 318, or other such objects present within virtual collaboration space 312. As will be described in more detail below, objects 502 and 504 may interact with virtual sound as a voice communication is simulated to acoustically propagate from, for example, a voice origination location of Avatar 1, through virtual collaboration space 312, to an avatar location of Avatar 2.

FIG. 5B shows an acoustic propagation view 500-B that corresponds to graphical user interface view 500-A of FIG. 5A. While graphical user interface view 500-A represents what might be shown to a user engaging in a virtual collaboration session (e.g., displayed in the communication portal presented by a particular communication device 304), acoustic propagation view 500-B illustrates the same scenario (e.g., the same virtual collaboration session at the same moment in time) but using respective icons 506 (e.g., icon 506-1 representative of Avatar 1 and icon 506-2 representative of Avatar 2) to illustrate where a voice communication 508 originates and terminates (e.g., where the communication is spoken and at least one place to where the communication propagates to be heard).

As shown, each icon 506 is shown to include an arrow pointing away from the icon in a particular direction, as well as two arrows pointing inward toward the icon 506. The direction of the outward-pointing arrow will be understood to be determined by the orientation of the corresponding avatar and to represent the direction in which communications originating at that location will be directed as the propagation simulation is performed. For example, as shown, icon 506-1 has an outward-pointing arrow pointing toward icon 506-2, thus corresponding to the direction in which Avatar 1 is shown to be facing in graphical user interface view 500-A (i.e., toward Avatar 2). The direction of the inward-pointing arrows of each icon 506 (which may be static with respect to one another and to the outward-facing arrow) will be understood to also be determined by the orientation of the corresponding avatar. However, these arrows may represent the virtual ears of the avatar in the sense that when virtual sound propagates to either of these arrows, system 100 may present the sound to a corresponding ear of the user in a manner that simulates being virtually present to hear the sound in the virtual space.

When sound virtually propagates to be heard at a particular location, the sound will be referred to as "terminating" at that location just as the sound is referred to as "originating" at the location where the propagation simulation begins. In FIG. 5B, both icons 506 are shown to include both the outward-pointing arrow (also referred to as an "origination arrow") and the inward-pointing arrows (also referred to as "termination arrows") in the same icon. As will be illustrated and described below, however, these symbols may be separated into different icons located at different locations in examples where a voice origination location and an avatar location are independently controlled and distinct from one another.

Voice communication 508 is illustrated as an arrow that originates at icon 506-1 and terminates at icon 506-2. This symbol indicates that voice communication 508 is spoken by User 1 (the user represented by Avatar 1 corresponding to icon 506-1) and directed at and heard by User 2 (the user represented by Avatar 2 corresponding to icon 506-2). While not explicitly illustrated by the arrow representing voice communication 508, it will be understood that voice communication 508 may propagate through virtual collaboration space 312, possibly being heard at other termination locations besides the avatar location of Avatar 2 (where icon 506-2 is shown). For example, while User 1 may direct voice communication 508 at User 2 (i.e., speak the words with the intention that User 2 hear them), voice communication 508 may also be heard incidentally by other users whose avatars are in the vicinity as voice communication 508 virtually propagates through the space.

To illustrate, FIG. 6 shows certain details of how virtual sound is simulated to propagate through virtual collaboration space 312. As shown, an icon 602-1 indicates the origination location of voice communication 508, an icon 604-2 indicates a termination location of voice communication 508, and various sound wave symbols of various sizes illustrate how virtual sound representative of voice communication 508 propagate through virtual collaboration space 312, reflect from surfaces such as the walls of virtual collaboration space 312 and objects 502 and 504, and so forth as they travel from the virtual mouth of Avatar 1 to the virtual ears of Avatar 2.

While icons 506 in FIG. 5B represented examples where a voice origination location symbolizing a virtual mouth (origination arrow) and a termination location symbolizing virtual ears (termination arrows) were located to coincide at the same location (i.e., the avatar locations of each respective avatar 314), icons 602 and 604 are shown to represent examples in which the voice origination location and termination location are independently controlled. Specifically, icon 602-1 will be understood to represent the voice origination location of User 1, where voice communication 508 originates. Icon 604-2 will then be understood to represent the termination location of User 2, where voice communication 508 arrives to be presented to (heard by) User 2.

While neither avatar location of Avatar 1 nor Avatar 2 is explicitly shown in FIG. 6, it will be understood that, in various implementations, the avatar location may coincide with a voice origination location of an avatar (e.g., indicated by an icon 602), coincide with a termination location of an avatar (e.g., indicated by an icon 604), or may be distinct from both of these locations. For examples described herein, it is generally assumed that the termination location and the avatar location for a particular avatar are the same, while the voice origination location of the particular avatar may be independently controlled as has been described. Accordingly, it will generally be the case for examples described herein that an avatar is shown to be located at an avatar location within a virtual collaboration space that also serves as the termination location from which the corresponding user audibly perceives the virtual world. In contrast, the voice origination location for the particular avatar may be distinct from the avatar location and may be indicated in the graphical user interface only to the user controlling it (i.e., the user associated with the particular avatar) in certain implementations, or to other users as well in other implementations.

In examples illustrated below, icons 506, 602, and 604 will be used (along with hyphenated postfixes to identify which user and avatar the icons are associated with) to indicate where each user's avatar speaks voice communications, receives (hears) voice communications, or does both. Arrows representative of voice communications 508 (along with hyphenated postfixes to identify which user and avatar originates the voice communication) are shown to originate at icons 506 or 602 and to terminate at icons 506 or 604 to indicate where communications are spoken and received, though it will be understood that more complex propagation of voice communications 508 throughout the virtual collaboration space may be simulated (such as illustrated in FIG. 6) to effect the end results represented by the voice communication arrows.

Figure 7B:
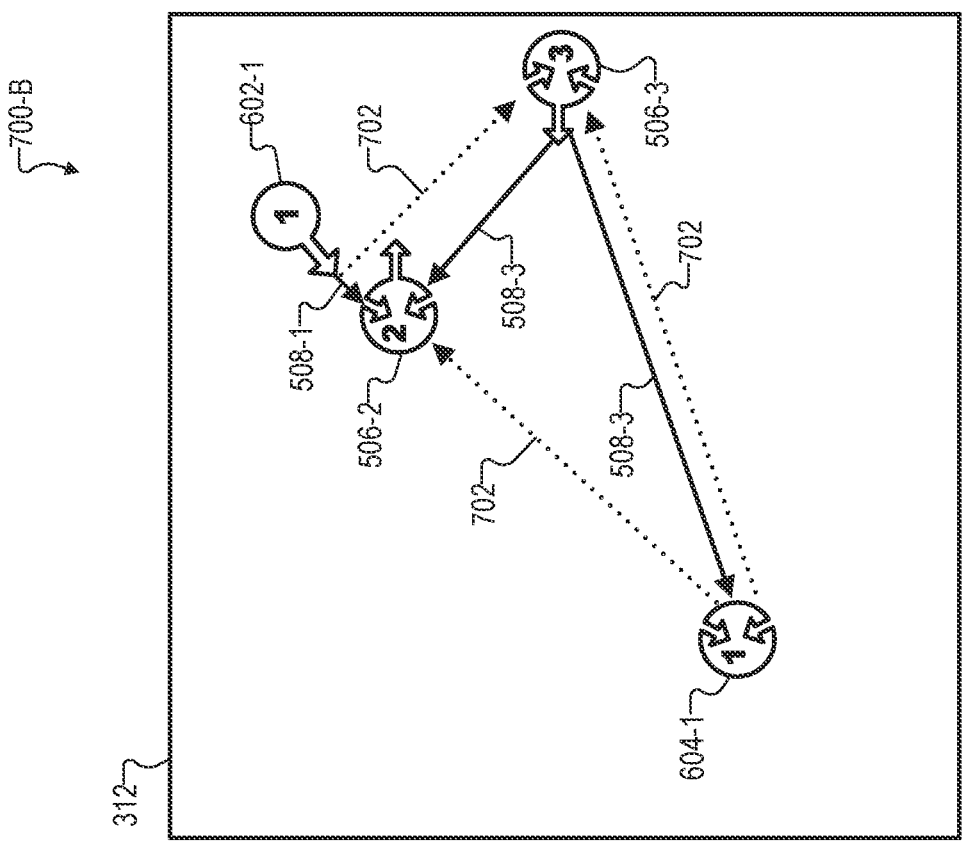
FIGS. 7A-7B show illustrative virtual collaboration sessions during which audio communications between users are simulated to propagate from different voice origination locations in accordance with principles described herein.
Figure 7A:
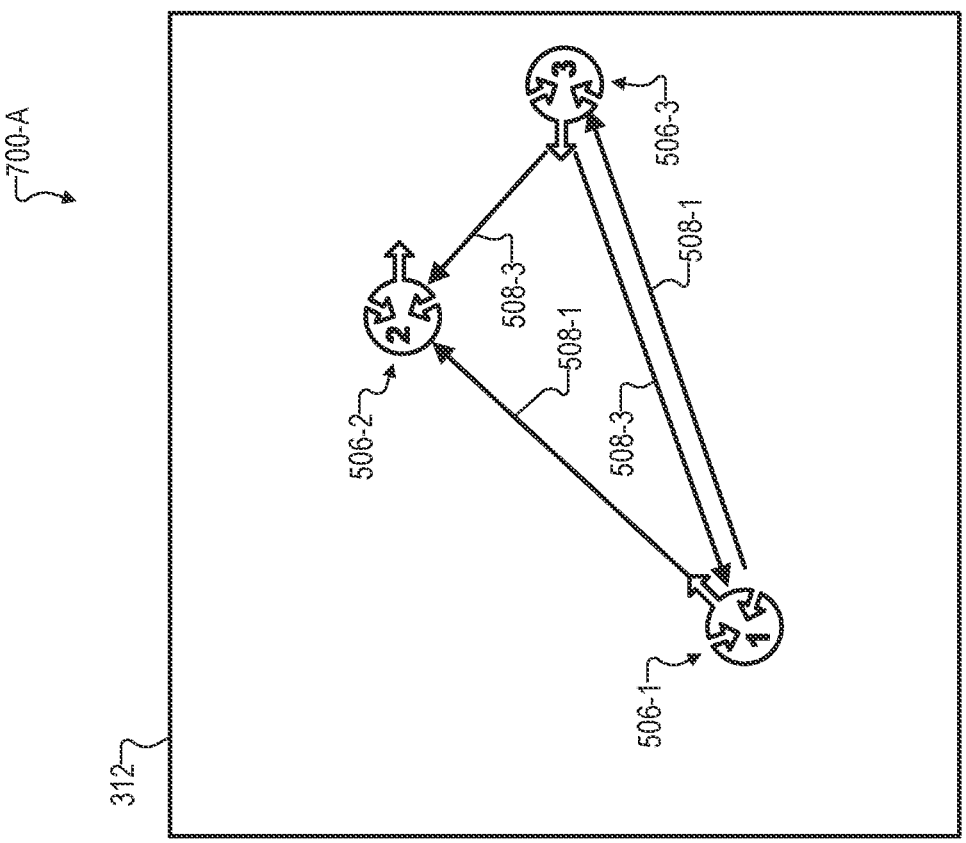

For example, FIG. 7A shows a first example of a virtual collaboration session 700-A during which audio communications between users are simulated to propagate from different voice origination locations that coincide with (i.e., are the same as) the avatar locations of the avatars originating the voice communications. Specifically, virtual collaboration session 700-A is shown to represent a scenario in which User 1 and User 2 are listening to a presentation being given by User 3. Each of these users may be represented within this implementation of virtual collaboration space 312 by respective avatars at respective avatar locations. As shown by respective icons 506-1 through 506-3, each avatar location may also serve as both the voice origination location and the termination location for that user.

During the presentation represented in virtual collaboration session 700-A, respective voice communications 508-3 are shown to originate from Avatar 3 (i.e., from the voice origination location at icon 506-3) and to reach both Avatar 1 (i.e., at the termination location of icon 506-1) and Avatar 2 (i.e., at the termination location of icon 506-2). In this scenario, User 1 may wish to communicate something to User 2 during the presentation (e.g., a comment about the presentation, a question about what is being presented, etc.). As such, User 1 may direct a voice communication 508-1 from his or her voice origination location (at icon 506-1) to the avatar location of Avatar 2 (at icon 506-2), where User 2 will be able to hear the communication. While voice communication 508-1 may only be intended for User 2, however, FIG. 7A shows that the standard sound propagation being performed may cause voice communication 508-1 to propagate not only to Avatar 2 (the intended recipient) but also to Avatar 3 (at icon 506-3), who may be an unintended recipient of the communication. For example, it may be distracting for User 3 to hear the comment of User 1 as User 3 is giving his or her presentation, yet, as with real-world sound propagation, virtual sound propagation simulated by system 100 may be such that, in this example, voice communication arrives at both the intended destination and at an unintended destination.

In contrast, FIG. 7B shows another example of a virtual collaboration session 700-B during which audio communications between users are simulated to propagate from different voice origination locations, but in which User 1 independently controls his or her voice origination location to be distinct from the avatar location of Avatar 1. Specifically, as shown in FIG. 7B, voice communications 508-3 still originate from Avatar 3 (the location of icon 506-3) and propagate to both Avatars 1 and 2 (at the locations, respectively, of icons 604-1 and 506-2), and the voice communication 508-1 spoken by User 1 is still directed to User 2 represented by Avatar 2 (located at an avatar location shown by icon 506-2) within virtual collaboration space 312. However, in contrast to virtual collaboration session 700-A of FIG. 7A, virtual collaboration session 700-B of FIG. 7B shows that a voice origination location of User 1 represented by an icon 602-1 is remote from an avatar location of Avatar 1 represented by an icon 604-1, and is proximate to the avatar location of Avatar 2 at icon 506-2. As such, while Avatar 1 remains in place at the avatar location relatively remote from the avatar location of Avatar 2, User 1 is able to virtually whisper right into the ear of User 2 by independently controlling his or her voice origination location to be remote from Avatar 1 and proximate to Avatar 2.

In this way, FIG. 7B shows that voice communication 508-1 originates from icon 602-1 (i.e., the voice origination location of Avatar 1 in this example) to propagate to icon 506-2 (i.e., the termination location and avatar location of Avatar 2 in this example) to allow User 2 to hear the comment of User 1 during the presentation being given by User 3. To emphasize certain distinctions from the scenario of FIG. 7A, FIG. 7B shows several dotted arrows 702 representative of sound propagation that does not occur in this example. For example, one dotted arrow 702 illustrates that no voice communication is simulated to propagate from the avatar location of Avatar 1 to the avatar location of Avatar 2, and other dotted arrows 702 illustrate that no voice communication is simulated to propagate from either the voice origination location or the avatar location of Avatar 1 to the avatar location of Avatar 3. Accordingly, voice communication 508-1 is simulated as an effective virtual whisper and User 3 advantageously does not hear or become distracted by any voice communication of User 1 while User 3 is presenting.

Even though voice communication 508-1 originates from the voice origination location of Avatar 1 at icon 602-1, it is noted that voice communication 508-3 spoken by User 3 is presented to User 1 based on propagation of voice communication 508-3 to the avatar location of Avatar 1 (at icon 604-1) and not based on propagation of voice communication 508-3 to the voice origination location of Avatar 1 (at icon 602-1). Additionally, as further illustrated in FIGS. 7A and 7B, it is noted that users are able to control not only their voice origination locations but also their voice origination directions (e.g., which direction they are facing, which direction their voice communications project into the virtual collaboration space as indicated by the origination arrows of icons 506 and 602). Specifically, user input received by system 100 from a user to represent a desired voice origination location for the user's avatar may be further representative of a voice origination direction within the virtual collaboration space. The propagation of voice communications originating from that user may then be simulated to originate from the voice origination location in the voice origination direction represented in the user input.

As has been mentioned, one advantage of providing users independent control of their voice origination location and their avatar location (e.g., including both where their avatar is located and the termination location where the user hears sounds virtually propagating through the virtual collaboration space) is that more specialized forms of impromptu communications may be more effectively implemented. While there may be several examples of such specialized impromptu communications (e.g., announcements made over a virtual public address system, games or other activities in which users wish to keep their avatar location secret and wish to avoid revealing the avatar location by way of their voice origination location, etc.), virtual whispering is a primary example of a specialized form of impromptu communication that is augmented by principles described herein.

Along with various advantages of moving a voice origination location away from a speaking user's avatar location to be near a listening user's avatar location as described above (and as particularly illustrated in FIG. 7B), system 100 may also be configured to perform various other techniques to increase the effectiveness and/or usefulness of virtual whispering. As one example, system 100 may simulate a whisper by lowering a volume of a voice communication presented to a user (e.g., User 2 in the example of FIG. 7B). More particularly, concurrently with or subsequent to the simulating of the propagation of the voice communication (e.g., voice communication 508-1) within the virtual collaboration space at operation 206, system 100 may be further configured to present, based on the simulating of the propagation of the voice communication, the voice communication as a virtual whisper to an additional user (e.g., User 2). In this example, the presenting of the voice communication may be performed at a whisper volume that is lower than a standard volume used for other voice communications that are not presented as virtual whispers from the voice origination location. For instance, User 2 may be presented with voice communication 508-1 in the example of FIG. 7B at a lower volume if voice communication 508-1 is designated as a virtual whisper than if it were a standard impromptu communication originating from the same location.

As another example, system 100 may simulate a whisper by disabling certain propagation effects such as reverberations, reflections, and so forth (e.g., including various reflections of voice communication 508 from walls and objects 502 and 504 as illustrated in FIG. 6). More particularly, concurrently with or subsequent to the simulating of the propagation of the voice communication (e.g., voice communication 508-1) within the virtual collaboration space at operation 206, system 100 may be further configured to present, based on the simulating of the propagation of the voice communication, the voice communication as a virtual whisper to an additional user (e.g., User 2). In this example, the presenting of the voice communication may be performed using a reflection parameter for simulating reflections of the voice communication that is lower than a standard reflection parameter used for voice communications not presented as virtual whispers from the voice origination location. For instance, the reflection parameter associated with a particular voice communication may be used by system 100 to determine and track the extent to which a sound is to reflect or reverberate as the sound is simulated to virtually propagate through a virtual space. While a standard reflection parameter may be employed for normal impromptu communications to attempt to simulate how sound would reverberate and reflect in a real-world, physical scenario, the reduced reflection parameter used for a virtual whisper may cause the sound to reflect and reverberate to a lesser degree or not at all so as to help limit the reach of the whisper's propagation.

As yet another example, system 100 may simulate a whisper by reducing a propagation radius of a particular voice communication. More particularly, concurrently with or subsequent to the simulating of the propagation of the voice communication (e.g., voice communication 508) within the virtual collaboration space at operation 206, system 100 may be further configured to present, based on the simulating of the propagation of the voice communication, the voice communication as a virtual whisper to an additional user (e.g., User 2). In this example, the presenting of the voice communication may include limiting the propagation of the voice communication to a whisper propagation radius that is lower than a standard propagation radius used for voice communications not presented as virtual whispers from the voice origination location. For instance, the propagation radius associated with a particular voice communication may be used by system 100 to determine and track how far from the origination location the particular voice communication is to propagate before dropping off or fading out entirely (e.g., becoming too quiet to hear because the sound source is too far away). While a standard propagation radius may be employed for normal impromptu communications to attempt to simulate how sound would drop off in a real-world, physical scenario, the reduced propagation radius used for a virtual whisper may cause the sound to drop off more quickly (e.g., over a shorter distance) so as to help limit the reach of the whisper's propagation.

Figure 8B:
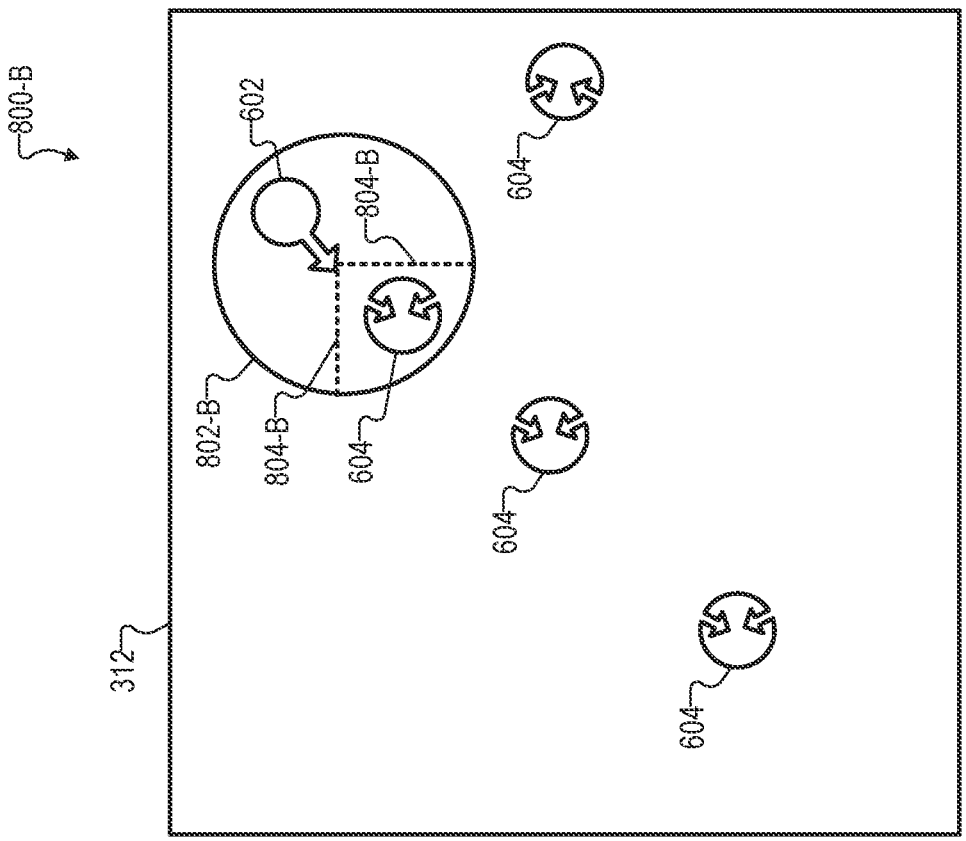
FIGS. 8A-8B show illustrative virtual collaboration sessions during which audio communications between users are simulated to propagate with different propagation radius parameters in accordance with principles described herein.
Figure 8A:
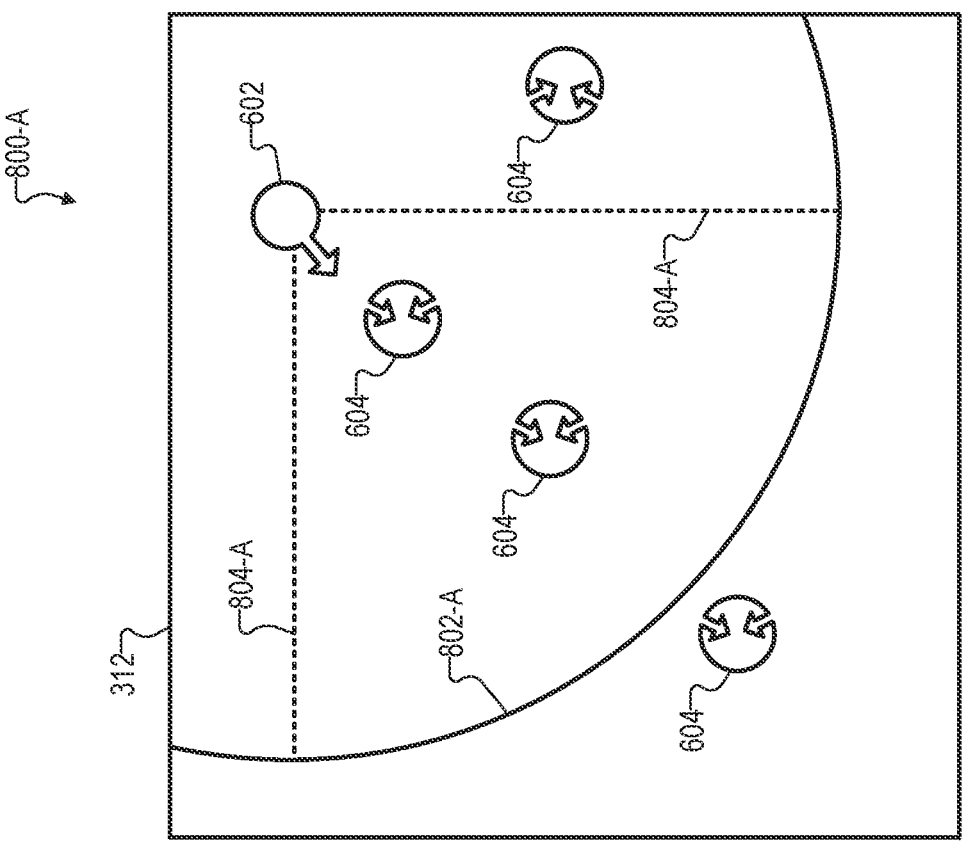
Figure 9B:
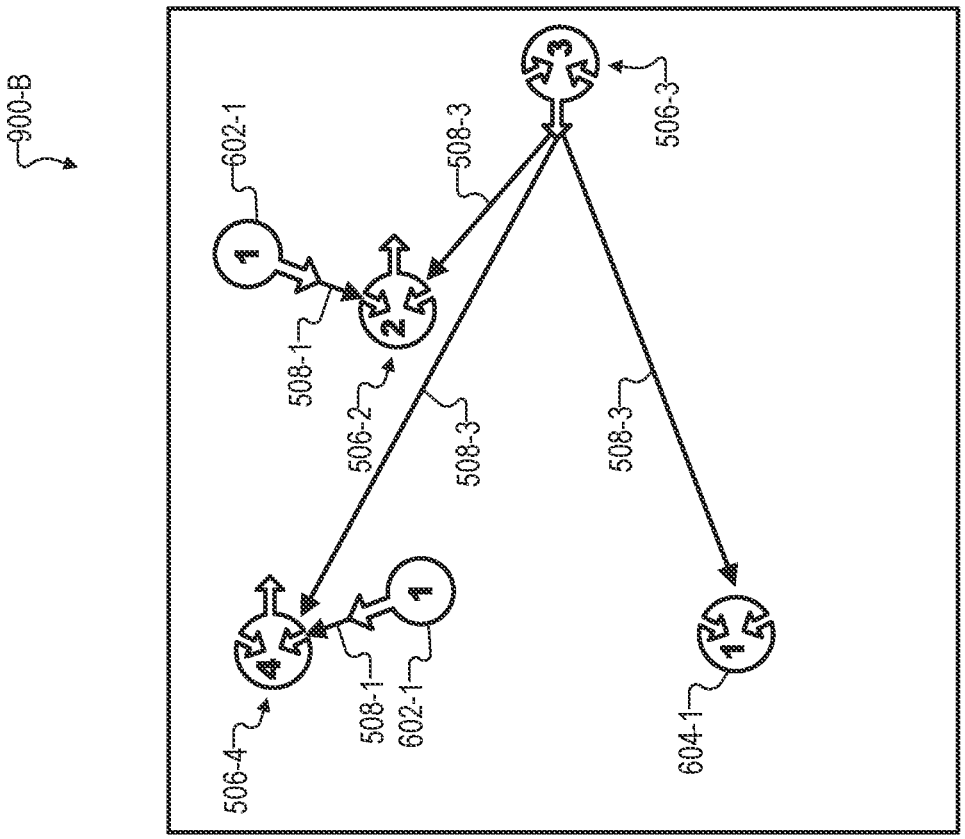
FIGS. 9A-9B show illustrative virtual collaboration sessions during which audio communications between users are simulated to propagate from multiple voice origination locations in accordance with principles described herein.
Figure 9A:
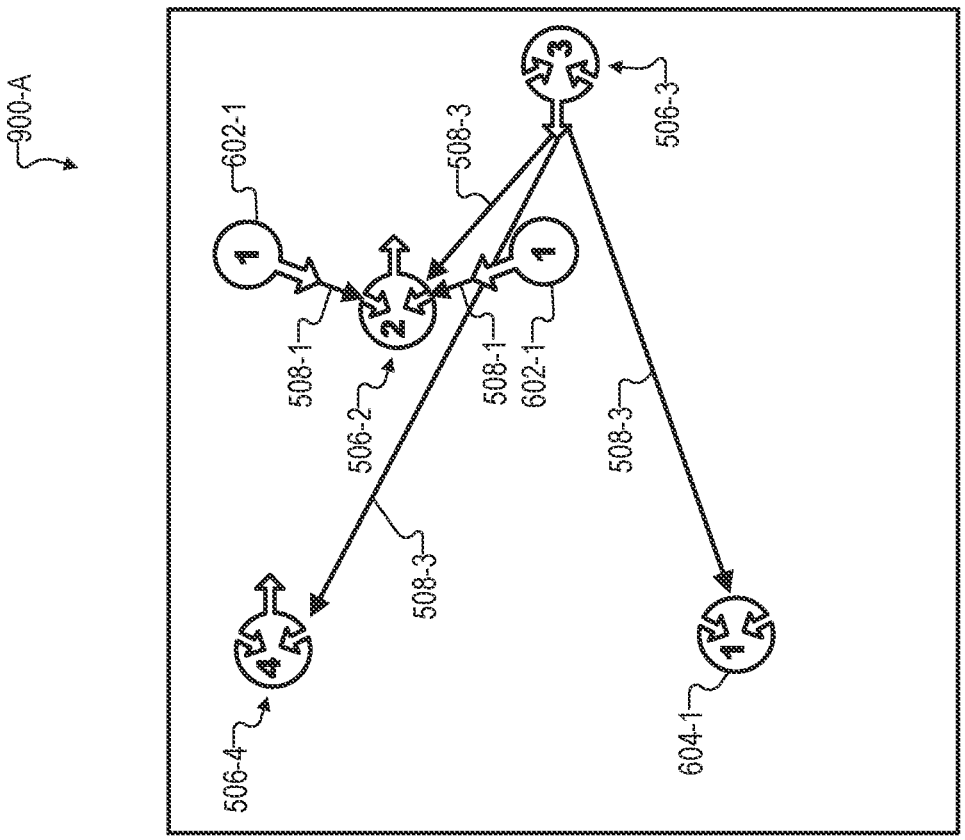

To illustrate, FIGS. 8A and 8B respectively show virtual collaboration sessions 800-A and 800-B during which audio communications between users are simulated to propagate with different propagation radius parameters. Specifically, as shown in both FIGS. 8A and 8B, an icon 602 represents a voice origination location of a speaking user and a plurality of icons 604 represent termination locations where avatars are located and for their corresponding users to be able to hear the voice communication originating at icon 602.

In virtual collaboration session 800-A, voice communications originating from icon 602 will be understood to be standard impromptu communications (rather than virtual whispers or another specialized form of impromptu communication). As such, a relatively large circle 802-A (or at least the portion of the circle that fits within this implementation of virtual collaboration space 312) is shown to represent the reach of the voice communications from icon 602. Circle 802-A is shown to have a relatively large propagation radius 804-A. Because of this relatively large propagation radius 804-A, FIG. 8A shows that all but one of the additional avatars in the virtual collaboration space (represented by icons 604) are located within circle 802-A so as to be within reach of the sound propagation of voice communications originating from icon 602.

In contrast, in virtual collaboration session 800-B, voice communications originating from icon 602 will be understood to be virtual whispers (rather than standard impromptu communications). As such, a relatively small circle 802-B that represents the reach of the voice communications is shown to have a relatively small propagation radius 804-B. As a result of this relatively small propagation radius 804-B, FIG. 8B shows that only one of the additional avatars in the virtual collaboration space (represented by icons 604) is located within circle 802-B so as to be within reach of the sound propagation of voice communications originating from icon 602. The users represented by avatars farther away from icon 602 than propagation radius 804-B (i.e., outside of circle 802-B) will not be presented with the virtual whisper originating at icon 602.

While circles are shown in FIGS. 8A and 8B and while the description above describes propagation in terms of "radius," it will be understood that, due to the directionality of how a particular voice communication is projected, the propagation of the voice communication may not actually be performed to cover a circle having a radius at the voice origination location, but, rather, may cover a circle centered at a different location or another type of shape (e.g., an ellipsis, a segment of a circle, etc.) that properly incorporates the directionality. Even in these examples, the principle of reducing the radius of propagation (or, in other words, the distance that a virtual whisper is simulated to propagate from its point of origination) will still be understood to apply.

Along with giving users more control of where voice communications originate (by allowing for voice origination locations to be controlled independently from avatar locations) and the extent to which voice communications virtually propagate through the virtual collaboration space (by implementing reduced volumes, reflection parameters, and propagation radius parameters, as described above), system 100 may also be configured to give users more information to help the users understand the reach of their voice communications. For example, along with presenting a voice communication to one or more other users represented by one or more respective avatars to which the voice communication is simulated to propagate (e.g., users whose avatars are located at the locations of icons 604 in FIGS. 8A and 8B), system 100 may also present (e.g., display within the user interface) a propagation vector at least to the speaking user (i.e., the user represented by an avatar associated with icon 602) and, in other examples, to other users as well. The propagation vector may be based on the simulating of the propagation of the voice communication and may be indicative of how far the voice communication propagates within the virtual collaboration space. To this end, the propagation vector may be implemented as a circle or other shape (similar to circles 802-A and 802-B shown in FIGS. 8A and 8B), an arrow or set of arrows, or in any other manner as may serve a particular implementation.

While certain attributes have been described that may be altered (e.g., reduced) to implement effective virtual whispers, it will be understood that these attributes (e.g., communication volume, reflection parameter, propagation radius, etc.) are only described as examples and other attributes and characteristics may also be altered or invoked to implement virtual whispers and/or other specialized types of impromptu communications in other implementations.

As one additional example, for instance, a private voice communication session for two users (e.g., User 1 and User 2 during the presentation being given by User 3 in the examples above) may be created to guarantee privacy for a whispered conversation between User 1 and User 2, as well as to avoid distracting User 3. In other examples, a semi-private voice communication session may be created to allow User 1 to whisper not only to User 2 but to other users as well (e.g., all of the users who are signed into the virtual collaboration space besides User 3, etc.).

As another additional example, system 100 may be configured to automatically detect that a particular voice communication is intended to be a virtual whisper and may influence any of the attributes above or other suitable attributes accordingly. For instance, system 100 may receiving a voice communication from the user and determine that the voice communication is spoken by the user at a volume level lower than a threshold volume level (e.g., a predetermined threshold below which the user has been determined to rarely speak unless whispering). Based on this determination, as well as other factors and/or technologies (e.g., machine learning trained to help detect whispering, etc.), system 100 may alter the communication volume, reflection parameter, propagation radius, or other such parameters as have been described to thereby implement the intended whisper.

In certain examples, system 100 may, based on the determining that the voice communication is spoken by the user at the volume level lower than the threshold volume level, alter a gain parameter associated with presenting the voice communication to an additional user. For example, an automatic gain control (AGC) or other algorithm may be configured to control a gain parameter to attempt to maintain a certain volume level of voice communications even though audio input may vary with various factors (e.g., type of microphone, speaker distance from the microphone, etc.). If a voice communication is spoken by a user at an intentionally low volume (e.g., because the user intends the voice communication as a whisper), it may not be desirable for the AGC algorithm to "correct" the low volume by adding gain to bring the voice communication up to the standard target volume. Accordingly, when a whisper is detected, the gain parameter may remain static or may at least be altered in a manner that accounts for the fact that the user is intending to whisper and likely does not wish to whisper at a normal speaking volume but at a lower volume.

In the examples described above, a single voice origination location (which may coincide with or be distinct from the avatar location of the corresponding avatar) has been described for each example. However, just as there may be multiple termination locations to which virtual sound propagates, multiple voice origination locations for a single voice communication may also be implemented by system 100 in certain examples. More particularly, the user input received by system 100 at operation 204 described above may include data indicating not only a first voice origination location but also an additional voice origination location that is also within the virtual collaboration space and that is distinct from both the avatar location and the first voice origination location. At operation 206, system 100 may then simulate the propagation of the voice communication to originate from both the first voice origination location and the additional voice origination location (and still not from the avatar location of the user).

To illustrate, FIGS. 9A-9B show illustrative virtual collaboration sessions 900-A and 900-B during which audio communications between users are simulated to propagate from multiple voice origination locations. In both these examples, the illustrated implementation of virtual collaboration space 312 includes four avatars 1-4, represented by icons 506, 602 and/or 604. Specifically, as in other examples described above, a User 3 represented by an Avatar 3 may be presenting to a User 1 (represented by an Avatar 1) and a User 2 (represented by an Avatar 2). In this example, another user, User 4 (represented by an Avatar 4), is also shown to be present in virtual collaboration space during the presentation. Each of Avatar 2, Avatar 3 and Avatar 4 are shown in FIGS. 9A and 9B to be represented by respective icons 506-2, 506-3, and 506-4 to indicate that their voice origination location and termination locations coincide with their avatar location. In the case of Avatar 1, however, FIGS. 9A and 9B show that, to enable and/or facilitate a virtual whisper that User 1 may wish to express during the presentation, an avatar location of Avatar 1 is represented by icon 604-1 while a plurality of voice origination locations of Avatar 1 are distinct from the avatar location (and from one another) and are represented by icons 602-1.

In the example of FIG. 9A, icons 602-1 are shown to both be located in the vicinity of Avatar 2 (icon 506-2) to allow User 1 to whisper to User 2 without being heard by User 3 or User 4. In this example, voice communication 508-1 is shown to originate from both icons 602-1 and to both terminate at icon 506-2 (at each respective ear of Avatar 2).

In the example of FIG. 9B, icons 602-1 are shown to be located near both Avatar 2 (icon 506-2) and Avatar 4 (icon 506-4) to allow User 1 to whisper to both User 2 and User 4 without being heard by User 3. Again, in this example, voice communication 508-1 is shown to originate from both icons 602-1, but now voice communication 508-1 terminates at two different icons 506 (icon 506-2 representing Avatar 2 and icon 506-4 representing Avatar 4).

In these and other examples described above, recipients of a virtual whisper (e.g., User 2 in FIG. 9A and Users 2 and 4 in FIG. 9B) may be selected by User 1 to receive a virtual whisper communication and the one or more voice origination locations may automatically be placed in the vicinity of the selected avatars to allow User 1 to virtually whisper to the select user(s) without the virtual whisper propagating beyond the avatar(s) of the selected user(s). For instance, in this example, the user input received by system 100 at operation 204 may indicate one or more target avatars selected by User 1 (e.g., Avatar 2 in the example of FIG. 9A, Avatars 2 and 4 in the example of FIG. 9B), which may represent a target user (e.g., User 2 or Users 2 and 4 in these examples) of the one or more other users virtually located within the virtual collaboration space. The voice origination location received in the user input at operation 204, as well as the duplicated voice origination location illustrated in these particular examples, may thus be derived from the user input based on a location of the target avatar(s) within virtual collaboration space 312 (such that the user input is representative of the voice origination location by virtue of the user input indicating the target avatar(s)). System 100 may then be configured to present, based on the simulating of the propagation of the voice communication, the voice communication as a virtual whisper to the target user(s) represented by target avatar(s) selected by User 1 (i.e., both ears of User 2 in the example of FIG. 9A, one ear of each of Users 2 and 4 in the example of FIG. 9B).

While this example describes how system 100 may assist in the control of a voice origination location when a user specifically wishes to virtually whisper to a particular user or group of users, it will be understood that system 100 may allow for the independent control of a user's voice origination location in any suitable manner. For example, rather than selecting one or more avatars to whom the user wishes to whisper, the user may directly drag an icon such as icon 602-1 to a desired location within virtual collaboration space 312 to thereby place the voice origination location at that location. In other examples, system 100 may allow the user to control the placement of the voice origination location in other ways as may serve a particular implementation.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 10:
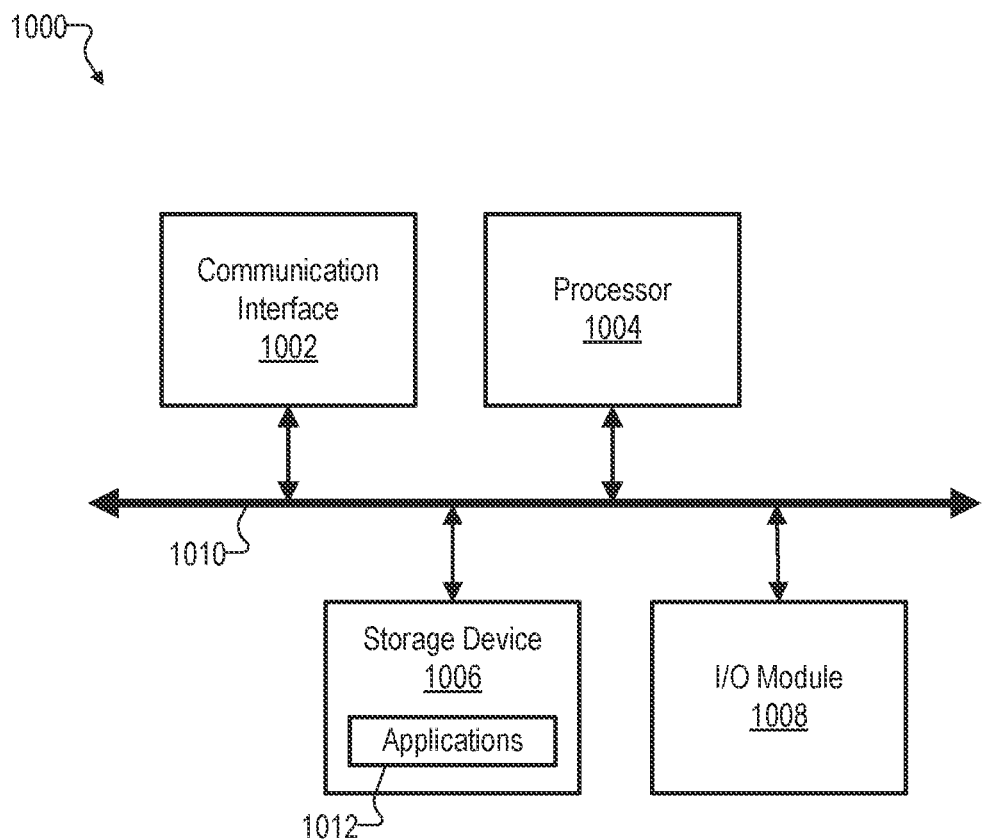
FIG. 10 shows an illustrative computing device that may implement collaboration space provider systems and/or other systems and devices described herein in accordance with principles described herein.

FIG. 10 shows an illustrative computing device 1000 that may implement collaboration space provider systems and/or other systems and devices described herein in accordance with principles described herein. For example, computing device 1000 may include or implement (or partially implement) a collaboration space provider system such as system 100 or any component included therein or any system associated therewith (e.g., communication devices 304, elements of network 308, communication servers 310, etc.).

As shown in FIG. 10, computing device 1000 may include a communication interface 1002, a processor 1004, a storage device 1006, and an input/output (I/O) module 1008 communicatively connected via a communication infrastructure 1010. While an illustrative computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with processor 104 of system 100. Likewise, memory 102 of system 100 may be implemented by or within storage device 1006.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
providing, by a collaboration space provider system, a virtual collaboration session that allows for audio communication between a user and one or more other users virtually located within a virtual collaboration space, the user represented by an avatar located at an avatar location within the virtual collaboration space;
receiving, by the collaboration space provider system from the user, user input representative of a voice origination location that is within the virtual collaboration space and is distinct from the avatar location; and
simulating, by the collaboration space provider system during the virtual collaboration session, propagation within the virtual collaboration space of a voice communication spoken by the user, the propagation of the voice communication simulated to originate from the voice origination location and not from the avatar location.

2. The method of claim 1, wherein:
the voice communication spoken by the user is directed to an additional user represented by an additional avatar located at an additional avatar location within the virtual collaboration space; and
the voice origination location is remote from the avatar location and proximate to the additional avatar location at which the additional avatar is located.

3. The method of claim 1, further comprising simulating, by the collaboration space provider system during the virtual collaboration session, propagation within the virtual collaboration space of an additional voice communication spoken by an additional user, the additional voice communication presented to the user based on propagation of the additional voice communication to the avatar location and not based on propagation of the additional voice communication to the voice origination location.

4. The method of claim 1, wherein:
the user input is further representative of an additional voice origination location that is within the virtual collaboration space and that is distinct from the avatar location and the voice origination location; and
the propagation of the voice communication is simulated to originate from both the voice origination location and the additional voice origination location and not from the avatar location.

5. The method of claim 1, wherein:
the user input indicates a target avatar selected by the user and representing a target user of the one or more other users virtually located within the virtual collaboration space;
the voice origination location is based on a location of the target avatar within the virtual collaboration space such that the user input is representative of the voice origination location by virtue of the user input indicating the target avatar; and
the method further comprises presenting, by the collaboration space provider system and based on the simulating of the propagation of the voice communication, the voice communication as a virtual whisper to the target user represented by the target avatar selected by the user.

6. The method of claim 1, further comprising presenting, by the collaboration space provider system and based on the simulating of the propagation of the voice communication, the voice communication as a virtual whisper to an additional user, the presenting of the voice communication performed at a whisper volume that is lower than a standard volume used for voice communications not presented as virtual whispers from the voice origination location.

7. The method of claim 1, further comprising presenting, by the collaboration space provider system and based on the simulating of the propagation of the voice communication, the voice communication as a virtual whisper to an additional user, the presenting of the voice communication including limiting the propagation of the voice communication to a whisper propagation radius that is lower than a standard propagation radius used for voice communications not presented as virtual whispers from the voice origination location.

8. The method of claim 1, further comprising presenting, by the collaboration space provider system and based on the simulating of the propagation of the voice communication, the voice communication as a virtual whisper to an additional user, the presenting of the voice communication performed using a reflection parameter for simulating reflections of the voice communication that is lower than a standard reflection parameter used for voice communications not presented as virtual whispers from the voice origination location.

9. The method of claim 1, wherein:
the user input is further representative of a voice origination direction within the virtual collaboration space; and
the propagation of the voice communication is simulated to originate from the voice origination location in the voice origination direction represented in the user input.

10. The method of claim 1, further comprising:
presenting, by the collaboration space provider system and based on the simulating of the propagation of the voice communication, the voice communication to one or more of the other users represented by one or more respective avatars to which the voice communication is simulated to propagate; and
presenting, by the collaboration space provider system and based on the simulating of the propagation of the voice communication, a propagation vector to the user, the propagation vector indicative of how far the voice communication propagates within the virtual collaboration space.

11. The method of claim 1, further comprising:
receiving, by the collaboration space provider system and from the user, the voice communication;
determining, by the collaboration space provider system, that the voice communication is spoken by the user at a volume level lower than a threshold volume level; and
altering, by the collaboration space provider system based on the determining that the voice communication is spoken by the user at the volume level lower than the threshold volume level, a gain parameter associated with presenting the voice communication to an additional user.

12. A system comprising:
a memory storing instructions; and
a processor communicatively coupled to the memory and configured to execute the instructions to:
provide a virtual collaboration session that allows for audio communication between a user and one or more other users virtually located within a virtual collaboration space, the user represented by an avatar located at an avatar location within the virtual collaboration space;
receive, from the user, user input representative of a voice origination location that is within the virtual collaboration space and is distinct from the avatar location; and
simulate, during the virtual collaboration session, propagation within the virtual collaboration space of a voice communication spoken by the user, the propagation of the voice communication simulated to originate from the voice origination location and not from the avatar location.

13. The system of claim 12, wherein:
the voice communication spoken by the user is directed to an additional user represented by an additional avatar located at an additional avatar location within the virtual collaboration space; and
the voice origination location is remote from the avatar location and proximate to the additional avatar location at which the additional avatar is located.

14. The system of claim 12, wherein the processor is further configured to execute the instructions to simulate, during the virtual collaboration session, propagation within the virtual collaboration space of an additional voice communication spoken by an additional user, the additional voice communication presented to the user based on propagation of the additional voice communication to the avatar location and not based on propagation of the additional voice communication to the voice origination location.

15. The system of claim 12, wherein:
the user input is further representative of an additional voice origination location that is within the virtual collaboration space and that is distinct from the avatar location and the voice origination location; and
the propagation of the voice communication is simulated to originate from both the voice origination location and the additional voice origination location and not from the avatar location.

16. The system of claim 12, wherein:
the user input indicates a target avatar selected by the user and representing a target user of the one or more other users virtually located within the virtual collaboration space;
the voice origination location is based on a location of the target avatar within the virtual collaboration space such that the user input is representative of the voice origination location by virtue of the user input indicating the target avatar; and
the processor is further configured to execute the instructions to present, based on the simulating of the propagation of the voice communication, the voice communication as a virtual whisper to the target user represented by the target avatar selected by the user.

17. The system of claim 12, wherein the processor is further configured to execute the instructions to present, based on the simulating of the propagation of the voice communication, the voice communication as a virtual whisper to an additional user, the presenting including at least one of:
presenting the voice communication at a whisper volume that is lower than a standard volume used for voice communications not presented as virtual whispers from the voice origination location;
limiting the propagation of the voice communication to a whisper propagation radius that is lower than a standard propagation radius used for voice communications not presented as virtual whispers from the voice origination location; or
using a reflection parameter for simulating reflections of the voice communication that is lower than a standard reflection parameter used for voice communications not presented as virtual whispers from the voice origination location.

18. The system of claim 12, wherein:
the user input is further representative of a voice origination direction within the virtual collaboration space; and
the propagation of the voice communication is simulated to originate from the voice origination location in the voice origination direction represented in the user input.

19. The system of claim 12, wherein, based on the simulating of the propagation of the voice communication, the processor is further configured to execute the instructions to:
present the voice communication to one or more of the other users represented by one or more respective avatars to which the voice communication is simulated to propagate; and
present, to the user, a propagation vector indicative of how far the voice communication propagates within the virtual collaboration space.

20. A non-transitory computer-readable medium storing instructions that, when executed, direct a processor of a computing device to:
provide a virtual collaboration session that allows for audio communication between a user and one or more other users virtually located within a virtual collaboration space, the user represented by an avatar located at an avatar location within the virtual collaboration space;
receive, from the user, user input representative of a voice origination location that is within the virtual collaboration space and is distinct from the avatar location; and
simulate, during the virtual collaboration session, propagation within the virtual collaboration space of a voice communication spoken by the user, the propagation of the voice communication simulated to originate from the voice origination location and not from the avatar location.

* * * * *